(12) United States Patent
Takahashi

(10) Patent No.: US 11,151,158 B2
(45) Date of Patent: Oct. 19, 2021

(54) DATA DUPLICATION DEVICE AND COMPUTER READABLE MEDIUM

(71) Applicant: MITSUBISHI ELECTRIC CORPORATION, Tokyo (JP)

(72) Inventor: Kazuko Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 20 days.

(21) Appl. No.: 16/604,791

(22) PCT Filed: May 31, 2017

(86) PCT No.: PCT/JP2017/020292
§ 371 (c)(1),
(2) Date: Oct. 11, 2019

(87) PCT Pub. No.: WO2018/220754
PCT Pub. Date: Dec. 6, 2018

(65) Prior Publication Data
US 2020/0104308 A1  Apr. 2, 2020

(51) Int. Cl.
*G06F 16/00* (2019.01)
*G06F 16/27* (2019.01)
(Continued)

(52) U.S. Cl.
CPC .......... *G06F 16/27* (2019.01); *G06F 16/2282* (2019.01); *G06F 16/2474* (2019.01)

(58) Field of Classification Search
CPC ... G06F 16/27; G06F 16/2282; G06F 16/2474
See application file for complete search history.

(56) References Cited

U.S. PATENT DOCUMENTS

| 6,049,738 A | 4/2000 | Kayama et al. |
| 2008/0243769 A1 | 10/2008 | Arbour et al. |

(Continued)

FOREIGN PATENT DOCUMENTS

| JP | 9-244705 A | 9/1997 |
| JP | 2003-84806 A | 3/2003 |

(Continued)

OTHER PUBLICATIONS

International Search Report, issued in PCT/JP2017/020292, PCT/ISA/210, dated Aug. 22, 2017.

(Continued)

*Primary Examiner* — Khanh B Pham
(74) *Attorney, Agent, or Firm* — Birch, Stewart, Kolasch & Birch, LLP

(57) ABSTRACT

A data duplication device (200) determines a duplication range using a data processing graph. The data processing graph indicates information of input/output data to and from a duplicate source program involved in a duplicate source system (110). The duplication range is a range of data to duplicate from the duplicate source system to a duplicate destination system (120). The data duplication device acquires duplicate data corresponding to the duplication range from the duplicate source system. The data duplication device registers the duplicate data with the duplicate destination system.

9 Claims, 24 Drawing Sheets

(51) Int. Cl.
    *G06F 16/22*         (2019.01)
    *G06F 16/2458*    (2019.01)

(56)               References Cited

U.S. PATENT DOCUMENTS

| | | | |
|---|---|---|---|
| 2009/0144235 A1* | 6/2009 | Bhide | G06F 16/2282 |
| 2009/0158080 A1 | 6/2009 | Furuya et al. | |
| 2010/0262862 A1 | 10/2010 | Watanabe et al. | |
| 2013/0151491 A1* | 6/2013 | Gislason | G06F 16/2282 |
| | | | 707/696 |
| 2016/0350392 A1* | 12/2016 | Rice | G06F 16/27 |
| 2017/0242904 A1 | 8/2017 | Hattori | |
| 2018/0018363 A1* | 1/2018 | Lin | G06F 16/2379 |

FOREIGN PATENT DOCUMENTS

| | | |
|---|---|---|
| JP | 2006-99793 A | 4/2006 |
| JP | 2008-257716 A | 10/2008 |
| JP | 2009-146169 A | 7/2009 |
| JP | 2010-244486 A | 10/2010 |
| WO | WO 2016/143095 A1 | 9/2016 |

OTHER PUBLICATIONS

Extended European Search Report, dated Feb. 7, 2020, for European Application No. 17911909.4.

\* cited by examiner

REFERENCE TABLE

| DATE AND TIME | DATE OF ACQUISITION | PREDICTION VALUE |
|---|---|---|
| 2017/01/15 00:00 | 2017/01/13 12:00 | 1000 |
| 2017/01/15 00:00 | 2017/01/14 12:00 | 1200 |
| 2017/01/15 01:00 | 2017/01/13 12:00 | 1100 |
| ... | ... | ... |

DUPLICATE DATA

| DATE AND TIME | DATE OF ACQUISITION | PREDICTION VALUE |
|---|---|---|
| 2017/01/15 00:00 | 2017/01/14 12:00 | 1200 |
| 2017/01/15 01:00 | 2017/01/14 12:00 | 800 |
| 2017/01/15 02:00 | 2017/01/14 12:00 | 1500 |
| ... | ... | ... |
| 2017/01/15 23:00 | 2017/01/14 12:00 | 550 |

DATA DUPLICATION DEVICE AND COMPUTER READABLE MEDIUM

TECHNICAL FIELD

The present invention relates to a technique to duplicate data between systems.

BACKGROUND ART

With the spread of the Internet of Things (IoT), an increase in the number of model creation systems that create prediction models is expected. A model creation system accumulates time-series data by collecting information from devices, and creates a prediction model using the time-series data.

It is difficult to completely verify in advance whether an output of the model creating system is appropriate. Therefore, it is necessary to evaluate the output of the model creation system continuously even after the start of operation.

If improvement is required in continuous evaluation, in order to identify a location of improvement and analyze an improvement method, it is necessary to reproduce a state of an operation environment database in a development environment database.

The operation environment database is a database owned by an operation environment system.

The operation environment system is a system which is under operation and which processes time-series data.

The development environment database is a database owned by the development environment system.

The development environment system is a system having a function that is of the same level as that of the operation environment system.

To reproduce is to copy the data necessary for identifying the location of improvement and analyzing the improvement method from the operation environment database to the development environment database.

Patent Literature 1 discloses a conventional database migration device which copies data from an operation environment database to a development environment database.

In the conventional database migration device, data is time-stamped. The oldest date and time is determined from a plurality of pieces of input data used in generating an output, and data on and after that date and time is copied. The database migration device is fabricated to compatible with the specifications of the operation environment database.

CITATION LIST

Patent Literature

Patent Literature 1: JP 2010-244486 A

SUMMARY OF INVENTION

Technical Problem

The conventional database migration device copies data on and after the oldest date and time including data not necessary for output analysis. Therefore, when the time interval of input data is sparse, the amount of data becomes large. Particularly, in a system where input data corresponding to an arbitrary period of several years ago is used, a large part of the data is those that are unnecessary for output examination and output evaluation, and the amount of data to be copied increases.

Also, the conventional database migration device depends on the specifications of an operation environment database. Therefore, when the specifications of the operation environment database are changed, it is necessary to re-fabricate the conventional database migration device.

An objective of the present invention is to be able to limit data to duplicate from a duplicate source system to a duplicate destination system.

Solution to Problem

A data duplication device according to the present invention includes:

a range determination unit to determine a duplication range using a data processing graph indicating information of input/output data to and from a duplicate source program involved in a duplicate source system, the duplication range being a range of data to duplicate from the duplicate source system to a duplicate destination system;

a data acquisition unit to acquire duplicate data corresponding to the duplication range from the duplicate source system; and a data registration unit to register the duplicate data with the duplicate destination system.

Advantageous Effects of Invention

According to the present invention, a duplication range is determined using a data processing graph, and data corresponding to the duplication range is duplicated. Therefore, data to duplicate from a duplicate source system to a duplicate destination system can be limited to data corresponding to the duplication range.

DESCRIPTION OF EMBODIMENTS

Figure 1:
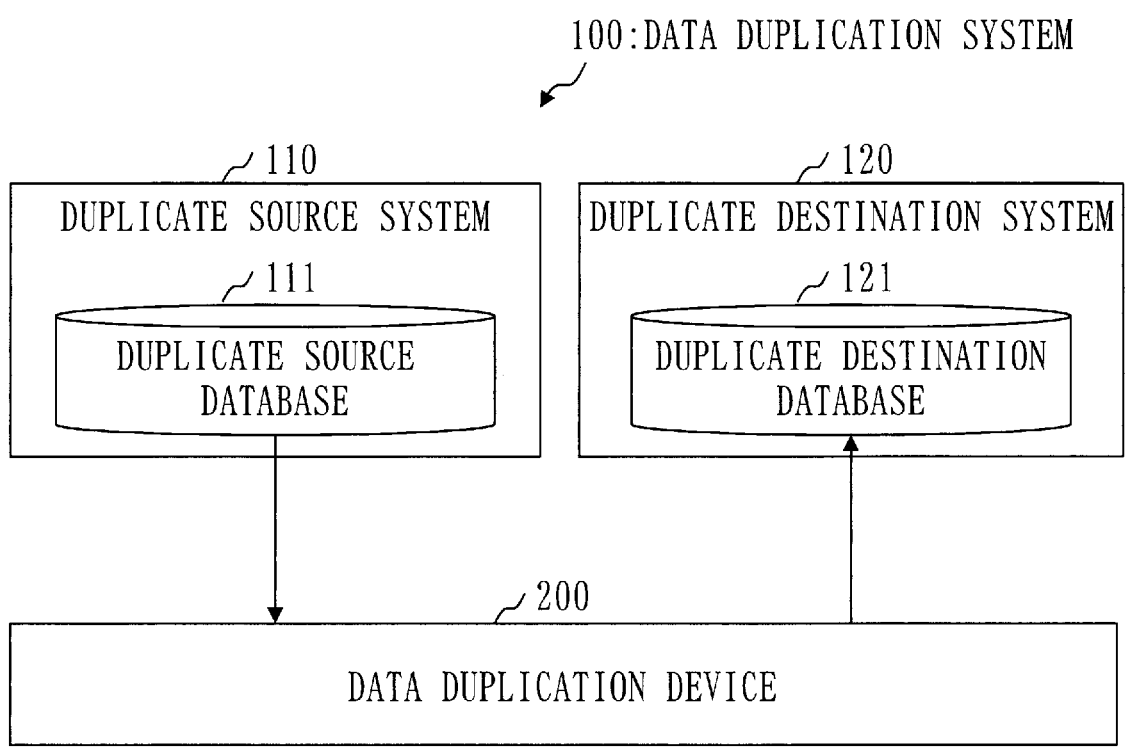
FIG. 1 is a configuration diagram of a data duplication system 100 in Embodiment 1.

In the embodiments and drawings, the same or equivalent elements are denoted by the same reference numeral. Descriptions of the elements denoted by the same reference numeral are omitted or simplified appropriately. Arrows in the drawings mainly indicate the flow of data or the flow of processing.

Embodiment 1

An embodiment in which data is duplicated from a duplicate source system to a duplicate destination system will be described referring to FIGS. 1 to 18.

Description of Configuration

A configuration of a data duplication system 100 will be described referring to FIG. 1.

The data duplication system 100 is a system that duplicates some of data in a duplicate source system 110 to a duplicate destination system 120.

The data duplication system 100 is provided with the duplicate source system 110, the duplicate destination system 120, and a data duplication device 200.

The duplicate source system 110 is provided with a duplicate source database 111.

More specifically, the duplicate source system 110 is an operation environment system and the duplicate source database 111 is an operation environment database.

The duplicate destination system 120 is provided with a duplicate destination database 121.

More specifically, the duplicate destination system 120 is a development environment system and the duplicate destination database 121 is a development environment database.

The data duplication device 200 is a device that duplicates some of data in the duplicate source database 111 to the duplicate destination database 121.

Figure 2:
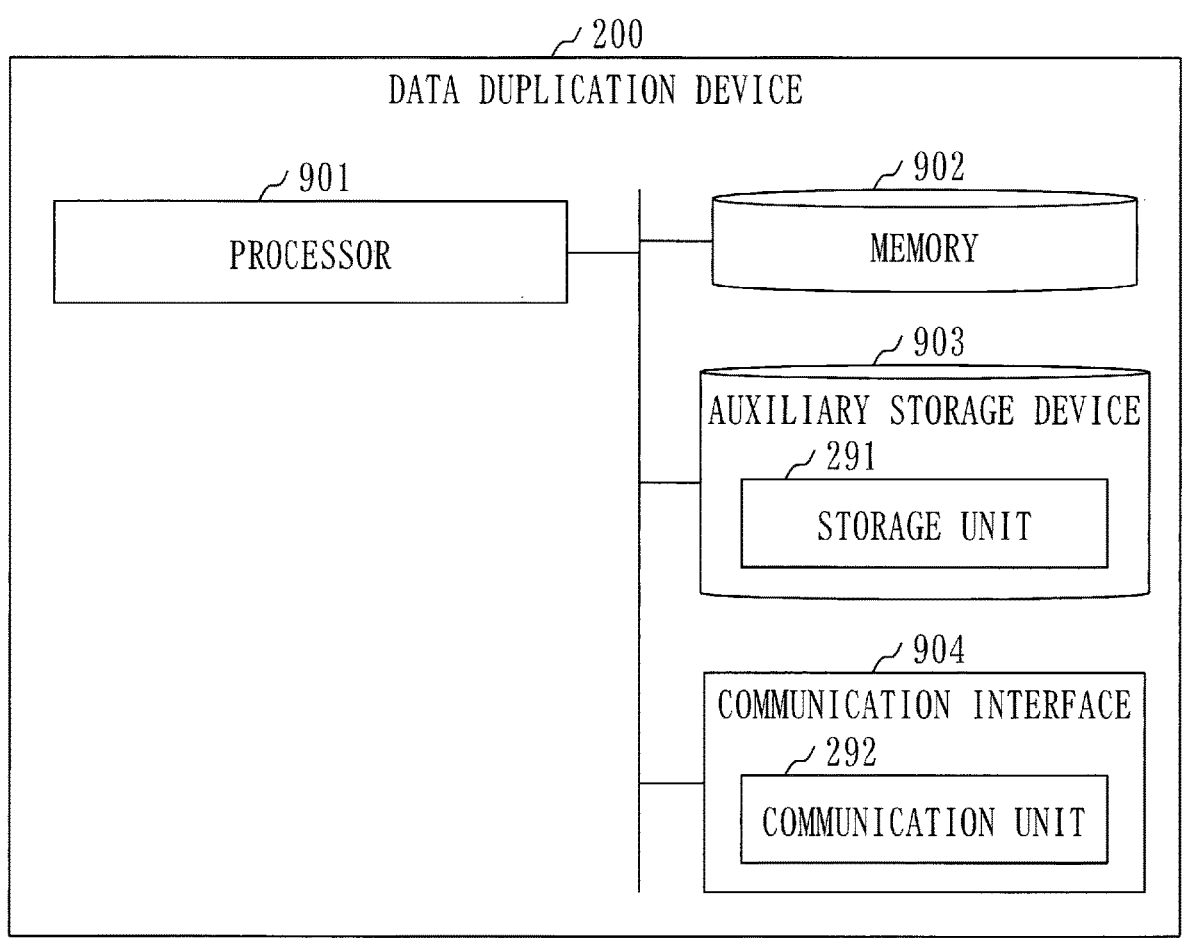
FIG. 2 is a configuration diagram of a data duplication device 200 in Embodiment 1.

A configuration of the data duplication device 200 will be described referring to FIG. 2.

The data duplication device 200 is a computer provided with hardware devices including a processor 901, a memory 902, an auxiliary storage device 903, and a communication interface 904. These hardware devices are connected to each other via signal lines.

The processor 901 is an integrated circuit (IC) that performs computation processing and controls the other hardware devices. The processor 901 is, for example, a central processing unit (CPU), a digital signal processor (DSP), or a graphics processing unit (GPU).

The memory 902 is a volatile storage device. The memory 902 is also called a main storage device or a main memory. The memory 902 is, for example, a random access memory (RAM). Data stored in the memory 902 is saved in the auxiliary storage device 903 as necessary.

The auxiliary storage device 903 is a non-volatile storage device. The auxiliary storage device 903 is, for example, a read only memory (ROM), a hard disk drive (HDD), or a flash memory. Data stored in the auxiliary storage device 903 is loaded to the memory 902 as necessary.

The communication interface 904 is equipment that performs communication, that is, the communication interface 904 includes a receiver and a transmitter. The communication interface 904 is, for example, a communication chip or a network interface card (NIC).

Data duplication program is stored in the auxiliary storage device 903. The data duplication program is loaded to the memory 902 and executed by the processor 901.

Furthermore, an operating system (OS) is stored in the auxiliary storage device 903. The OS is at least partly loaded to the memory 902 and executed by the processor 901.

That is, the processor 901 executes the data duplication program while executing the OS.

Data obtained by executing the data duplication program is stored in a storage device such as the memory 902, the auxiliary storage device 903, a register in the processor 901, and a cache memory in the processor 901.

The auxiliary storage device 903 functions as a storage unit 291 to store data. Another storage device may function as the storage unit 291 in place of the auxiliary storage device 903 or together with the auxiliary storage device 903.

The communication interface 904 functions as a communication unit 292 to communicate data.

The data duplication device 200 may be provided with a plurality of processors that replace the processor 901. The plurality of processors share the role of the processor 901.

Figure 3:
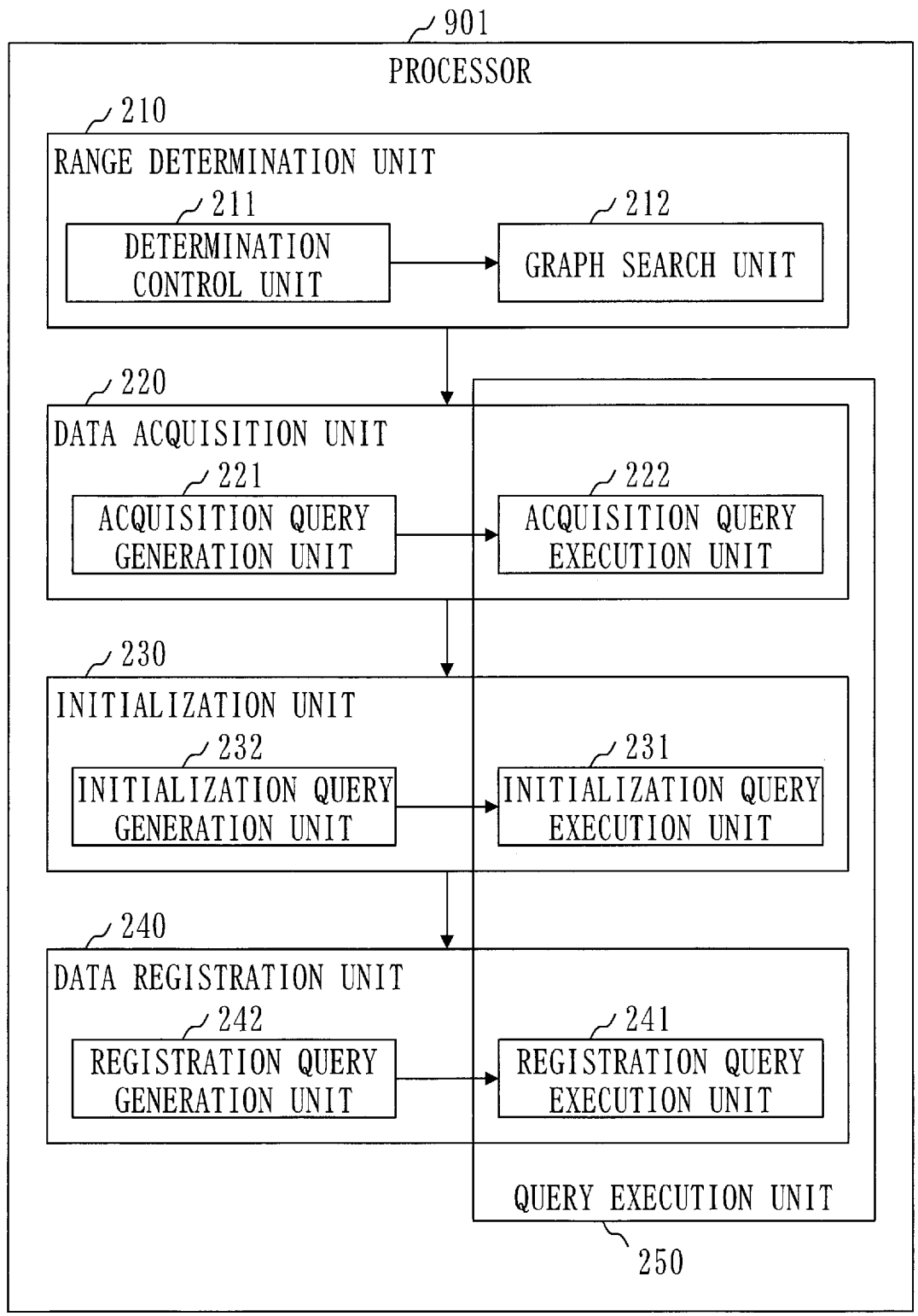
FIG. 3 is a functional configuration diagram of a processor 901 in Embodiment 1.

A functional configuration of the processor 901 will be described referring to FIG. 3.

The processor 901 functions as a range determination unit 210, a data acquisition unit 220, an initialization unit 230, and a data registration unit 240.

The range determination unit 210 is provided with a determination control unit 211 and a graph search unit 212.

The data acquisition unit 220 is provided with an acquisition query generation unit 221 and an acquisition query execution unit 222.

The initialization unit 230 is provided with an initialization query execution unit 231 and an initialization query generation unit 232.

The data registration unit 240 is provided with a registration query execution unit 241 and a registration query generation unit 242.

A query execution unit 250 is a generic term for the acquisition query execution unit 222, initialization query execution unit 231, and registration query execution unit 241.

The data duplication program is a program to cause the computer to function as the range determination unit 210, the data acquisition unit 220, the initialization unit 230, and the data registration unit 240.

The data duplication program can be computer-readably stored in a non-volatile storage medium such as a magnetic disk, an optical disk, and a flash memory. A non-volatile storage medium is a non-transitory tangible medium.

Figure 4:
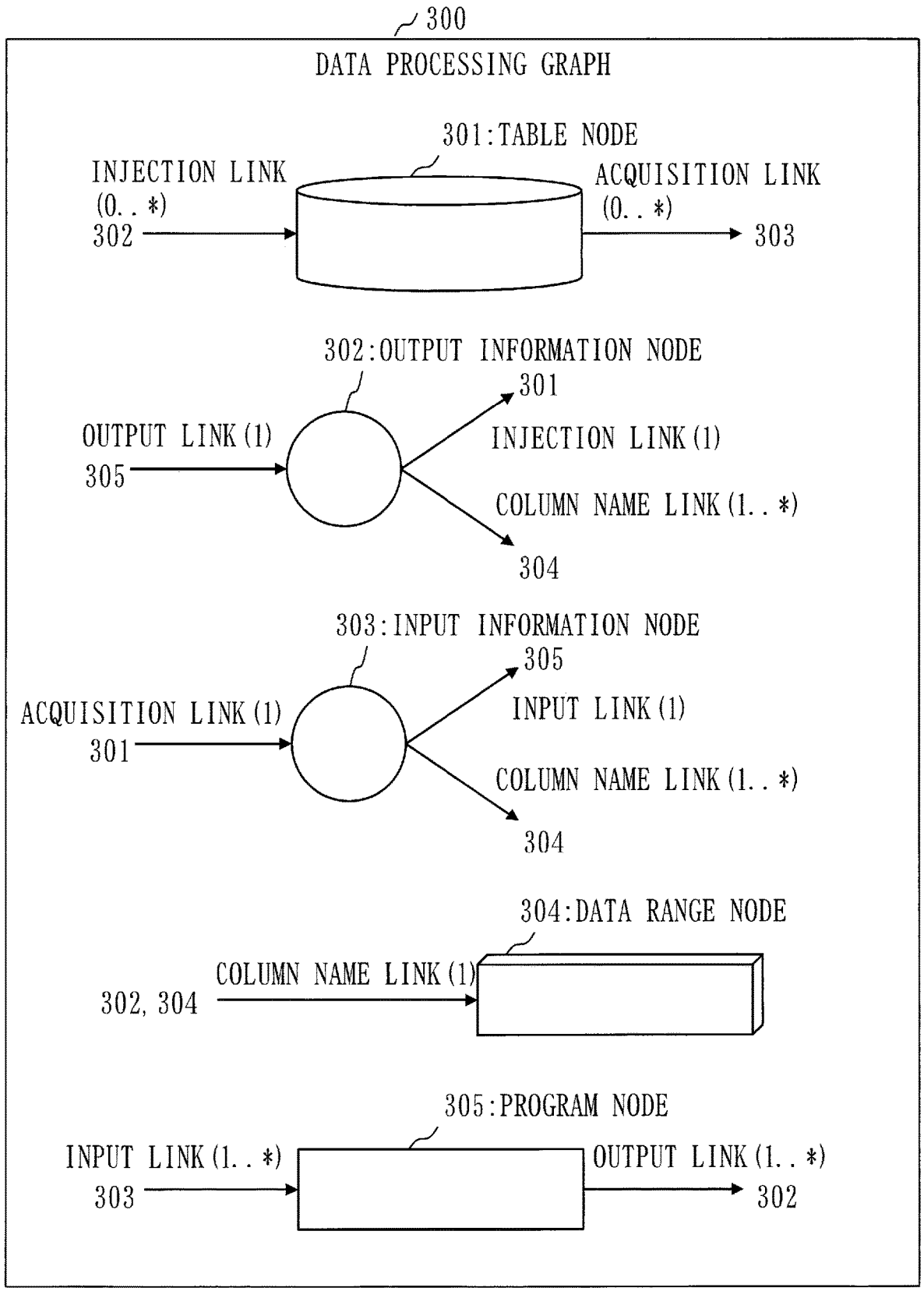
FIG. 4 is a configuration diagram of a data processing graph 300 in Embodiment 1.

A configuration of a data processing graph 300 will be described referring to FIG. 4.

The data processing graph 300 is data indicating information of input/output data to and from a duplicate source program, and is stored in the storage unit 291 in advance.

The duplication source program is a program involved in the duplicate source system 110.

More specifically, the input/output data to and from the duplicate source program is time-series data. Time-series data is data containing date and time.

The data processing graph 300 is data to dedicate to the duplicate source database 111. Hence, when the specifications of the duplicate source database 111 are changed, the data processing graph 300 is updated. When a duplicate source database that is different from the duplicate source database 111 is the duplicate source, a data processing graph dedicated to the different duplicate source database is stored in the storage unit 291.

The data processing graph 300 has one or more table nodes 301, one or more output information nodes 302, one or more input information nodes 303, one or more data range nodes 304, and one or more program nodes 305. Each node is connected to another node via a link.

A link from the output information node 302 to the table node 301 is called an injection link. The injection link connects the output information node 302 to the table node 301.

A link from the table node 301 to the input information node 303 is called an acquisition link. The acquisition link connects the table node 301 to the input information node 303.

A link from the input information node 303 to the program node 305 is called an input link. The input link connects the input information node 303 to the program node 305.

A link from the program node 305 to the output information node 302 is called an output link. The output link connects the program node 305 to the output information node 302.

A link from the output information node 302 or input information node 303 to the data range node 304 is called a column name link. The column name link connects the output information node 302 or input information node 303 to the data range node 304.

The data processing graph 300 has a table node 301 for each duplicate source table. The duplicate source table is a table contained in the duplicate source database 111.

The table node 301 indicates a duplicate source node.

An injection link indicates input to the table node 301. Input to the table node 301 is constituted of 0 or more pieces of data information.

An acquisition link indicates output from the table node 301. Output from the table node 301 is constituted of 0 or more pieces of data information.

The output information node 302 indicates information of output data out of input/output data to and from the duplicate source program.

An output link indicates input to the output information node 302. Input to the output information node 302 is constituted of an output link from one program node 305.

An injection link indicates first output from the output information node 302. The first output from the output information node 302 is the injection link to one table node 301.

A column name link indicates second output from the output information node 302. The second output from the output information node 302 is constituted of one or more column names A column name indicates the type of data.

The input information node 303 indicates information of input data out of the input/output data to and from the duplicate source program.

An acquisition link indicates input to the input information node 303. Input to the input information node 303 is an acquisition link from one table node 301.

An input link indicates first output from the input information node 303. The first output from the input information node 303 is an input link to one program node 305.

A column name link indicates second output from the input information node 303. The second output from the input information node 303 is constituted of one or more column names.

The data range node 304 indicates a data range of the input/output data to and from the duplicate source program. The data range expresses a range of a value indicated by the data. More specifically, the data range expresses a relative period and a target time frame. The relative period is indicated by the number of days, hours, or the like. The target time frame is indicated by date, time, or the like.

A column name link indicates input to the data range node 304. Input to the data range node 304 is constituted of one column name.

The data range node 304 to which the column name link from the output information node 302 is connected is called output range node.

The data range node 304 to which the column name link from the input information node 303 is connected is called input range node.

The program node 305 indicates the duplicate source program.

An input link indicates input to the program node 305. Input to the program node 305 is constituted of the input link from each of one or more input information nodes 303.

An output link indicates output from the program node 305. Output from the program node 305 is constituted of the output link to each of one or more output information nodes 302.

Description of Operation

An operation of the data duplication device 200 corresponds to a data duplication method. A procedure of the data duplication method corresponds to a procedure of the data duplication program.

Figure 5:
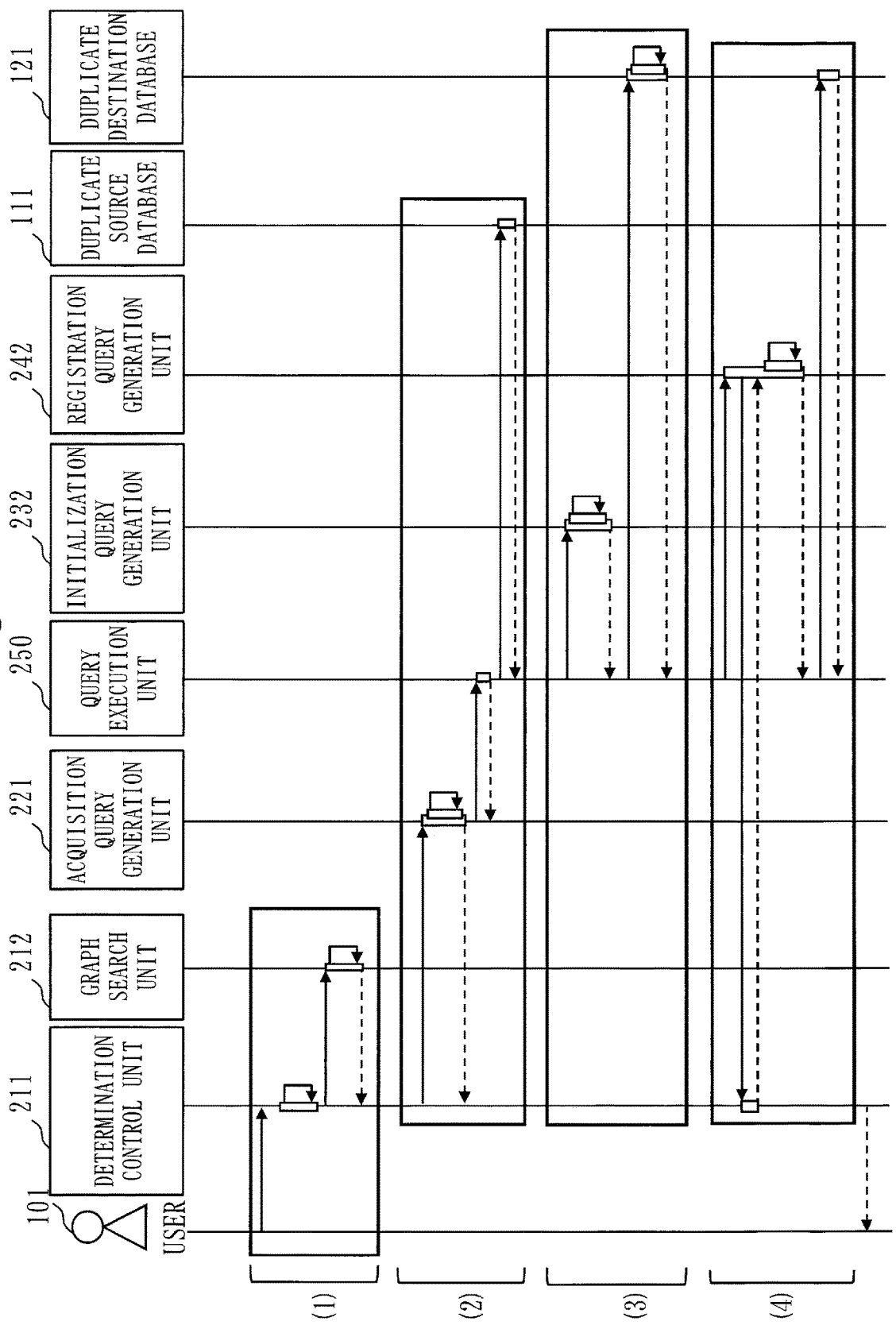
FIG. 5 is a schematic diagram of a data duplication method in Embodiment 1.

The data duplication method will be briefly described referring to FIG. 5.

In the data duplication method, processing (1) to processing (4) are sequentially carried out.

Figure 6:
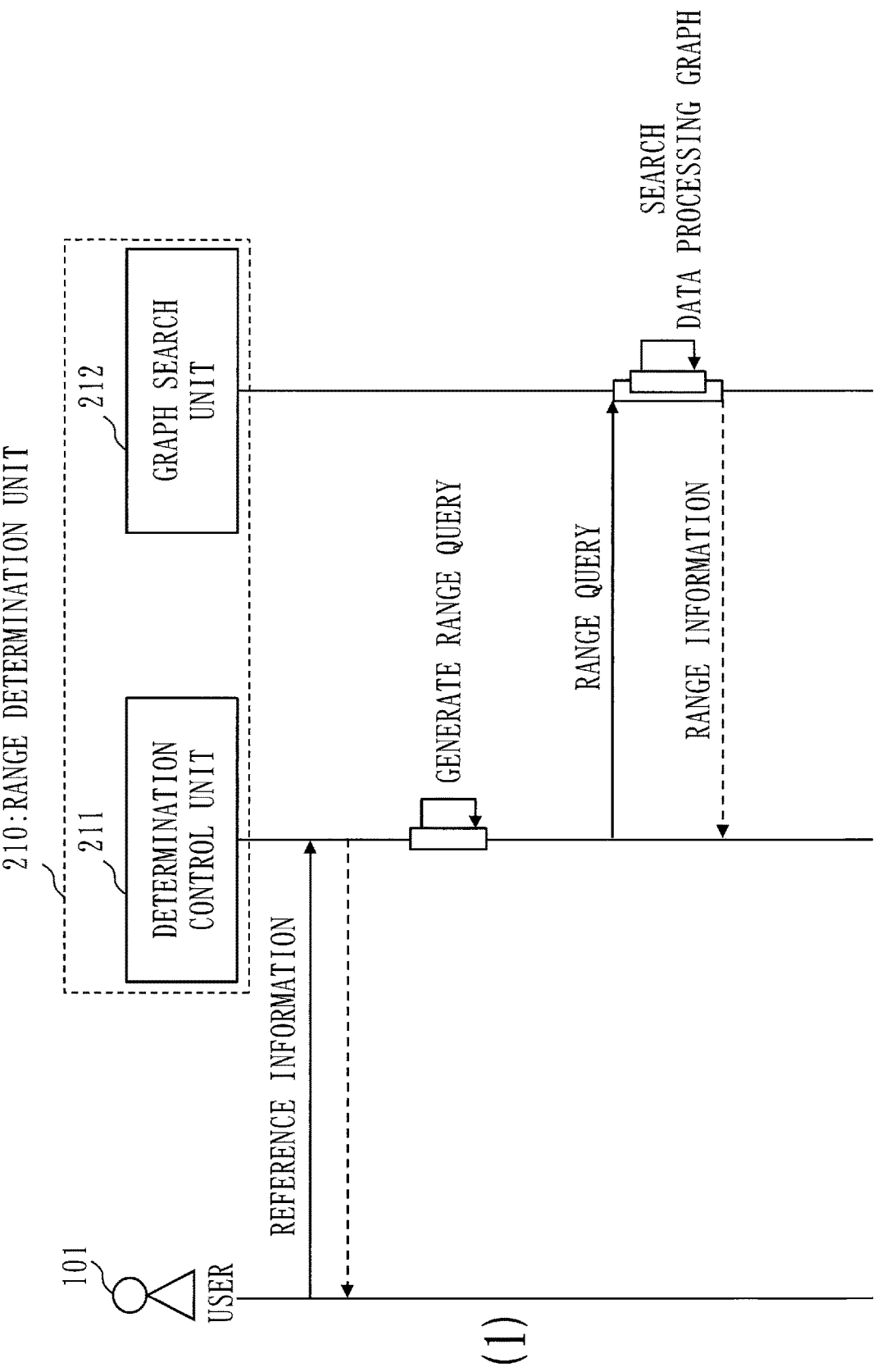
FIG. 6 is a schematic diagram of processing (1) of the data duplication method in Embodiment 1.

Processing (1) of the data duplication method will be described referring to FIG. 6.

In processing (1), the range determination unit 210 determines a duplication range using the data processing graph 300.

The duplication range is a range of data to duplicate from the duplicate source database 111 to the duplicate destination database 121. More specifically, the duplication range is a range of dates and times contained in the data to duplicate.

More specifically, the duplication range is determined as follows.

First, a user 101 inputs reference information to the data duplication device 200. The determination control unit 211 receives the inputted reference information and stores it in the storage unit 291.

The reference information is information for determining the data to duplicate from the duplicate source database 111 to the duplicate destination database 121. More specifically, the reference information indicates a table name, a time point, a user name, and so on. The date, time of day, and date and time are examples of the time point.

The determination control unit 211 generates a range query based on the reference information.

The range query is a query for requesting search of the duplication range and contains the reference information.

The determination control unit 211 inputs the range query to the graph search unit 212.

The graph search unit 212 searches the data processing graph 300 according to the range query to thereby acquire the duplication range from the data processing graph 300.

Then, the graph search unit 212 outputs range information to the determination control unit 211. The range information is information indicating the duplication range.

Figure 7:
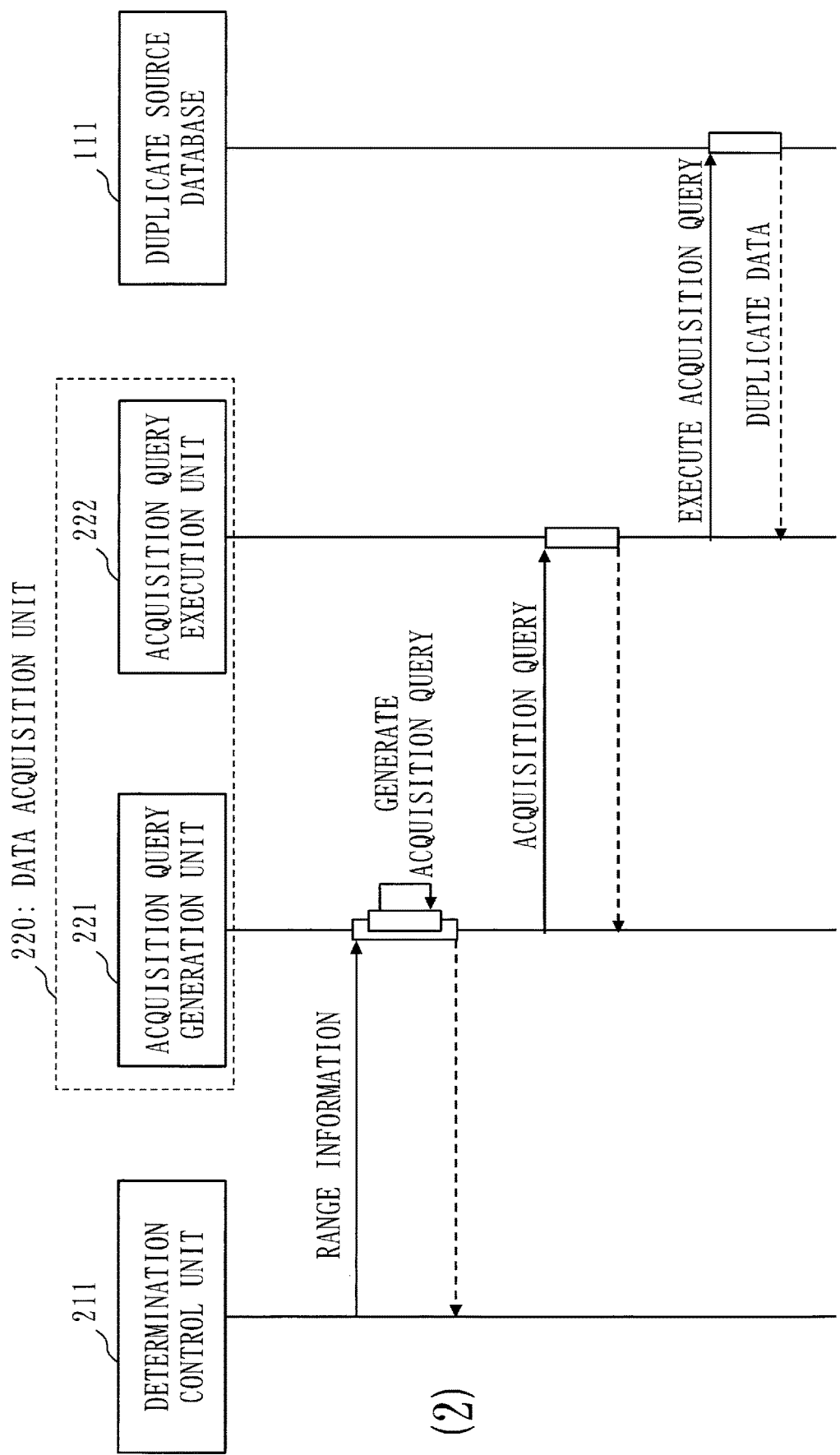
FIG. 7 is a schematic diagram of processing (2) of the data duplication method in Embodiment 1.

Processing (2) of the data duplication method will be described referring to FIG. 7.

In processing (2), the data acquisition unit 220 acquires duplicate data from the duplicate source database 111.

The duplicate data is data obtained by duplicating data corresponding to the duplication range out of data contained in the duplicate source database 111. That is, the duplicate data is data corresponding to the duplication range.

More specifically, the duplicate data is acquired as follows.

First, the determination control unit 211 inputs the range information to the acquisition query generation unit 221.

The acquisition query generation unit 221 generates an acquisition query based on the range information.

The acquisition query is a query for acquiring the duplicate data and contains the range information.

The acquisition query generation unit 221 inputs the acquisition query to the acquisition query execution unit 222.

Then, the acquisition query execution unit 222 executes the acquisition query on the duplicate source database 111 to thereby acquire the duplicate data from the duplicate source database 111.

Figure 8:
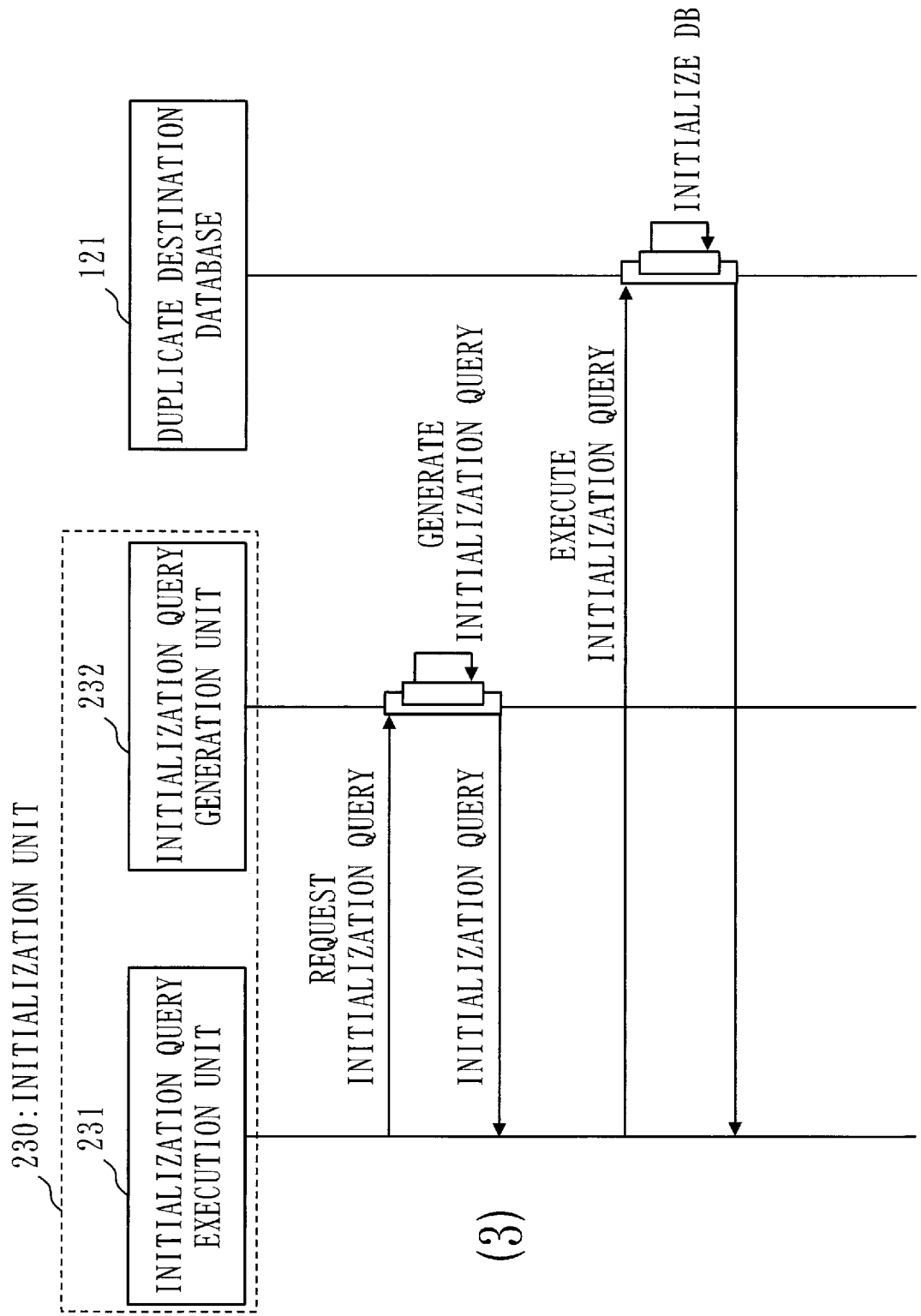
FIG. 8 is a schematic diagram of processing (3) of the data duplication method in Embodiment 1.

Processing (3) of the data duplication method will be described referring to FIG. 8.

In processing (3), the initialization unit 230 initializes the duplicate destination database 121.

More specifically, the duplicate destination database 121 is initialized as follows.

First, the initialization query execution unit 231 requests an initialization query from the initialization query generation unit 232.

The initialization query is a query for initializing the duplicate destination database 121.

The initialization query generation unit 232 generates an initialization query.

The initialization query generation unit 232 responds to the initialization query execution unit 231 with the initialization query.

Then, the initialization query execution unit 231 executes the initialization query on the duplicate destination database 121 to thereby initialize the duplicate destination database 121.

Figure 9:
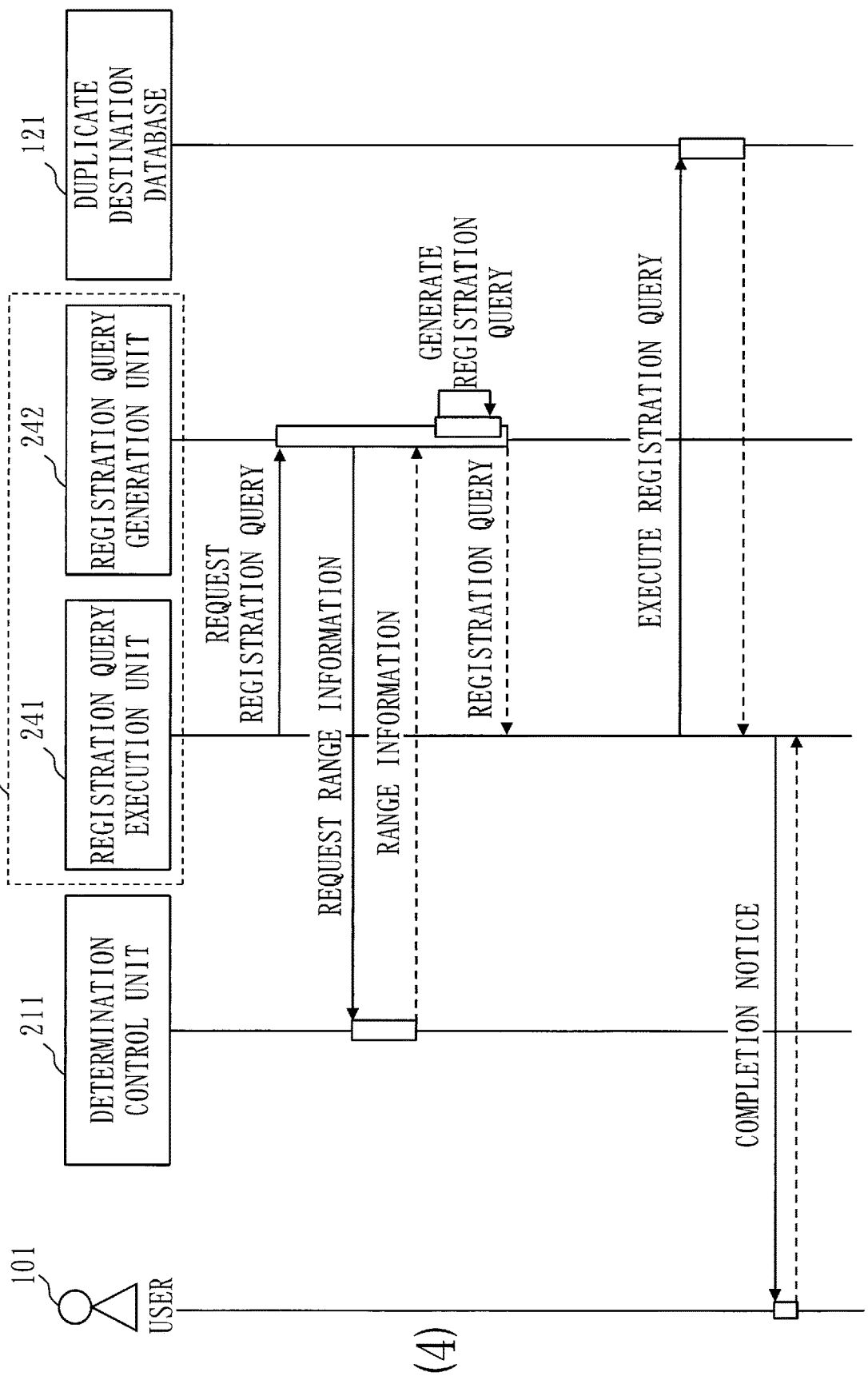
FIG. 9 is a schematic diagram of processing (4) of the data duplication method in Embodiment 1.

Processing (4) of the data duplication method will be described referring to FIG. 9.

In processing (4), the data registration unit 240 registers the duplicate data with the duplicate destination database 121.

More specifically, the duplicate data is registered as follows.

First, the registration query execution unit 241 requests a registration query from the registration query generation unit 242.

The registration query is a query used for registering the duplicate data with the duplicate destination database 121 and contains the duplicate data and the range information.

The registration query generation unit 242 requests the range information from the determination control unit 211.

The determination control unit 211 responds to the registration query generation unit 242 with the range information.

The registration query generation unit 242 generates a registration query based on the range information.

The registration query generation unit 242 responds to the registration query execution unit 241 with the registration query.

The registration query execution unit 241 executes the registration query on the duplicate destination database 121 to thereby register the duplicate data with the duplicate destination database 121.

Then, the registration query execution unit 241 outputs a completion notice.

The completion notice is a notice used for notifying the user 101 of the completion of duplication.

Figure 10:
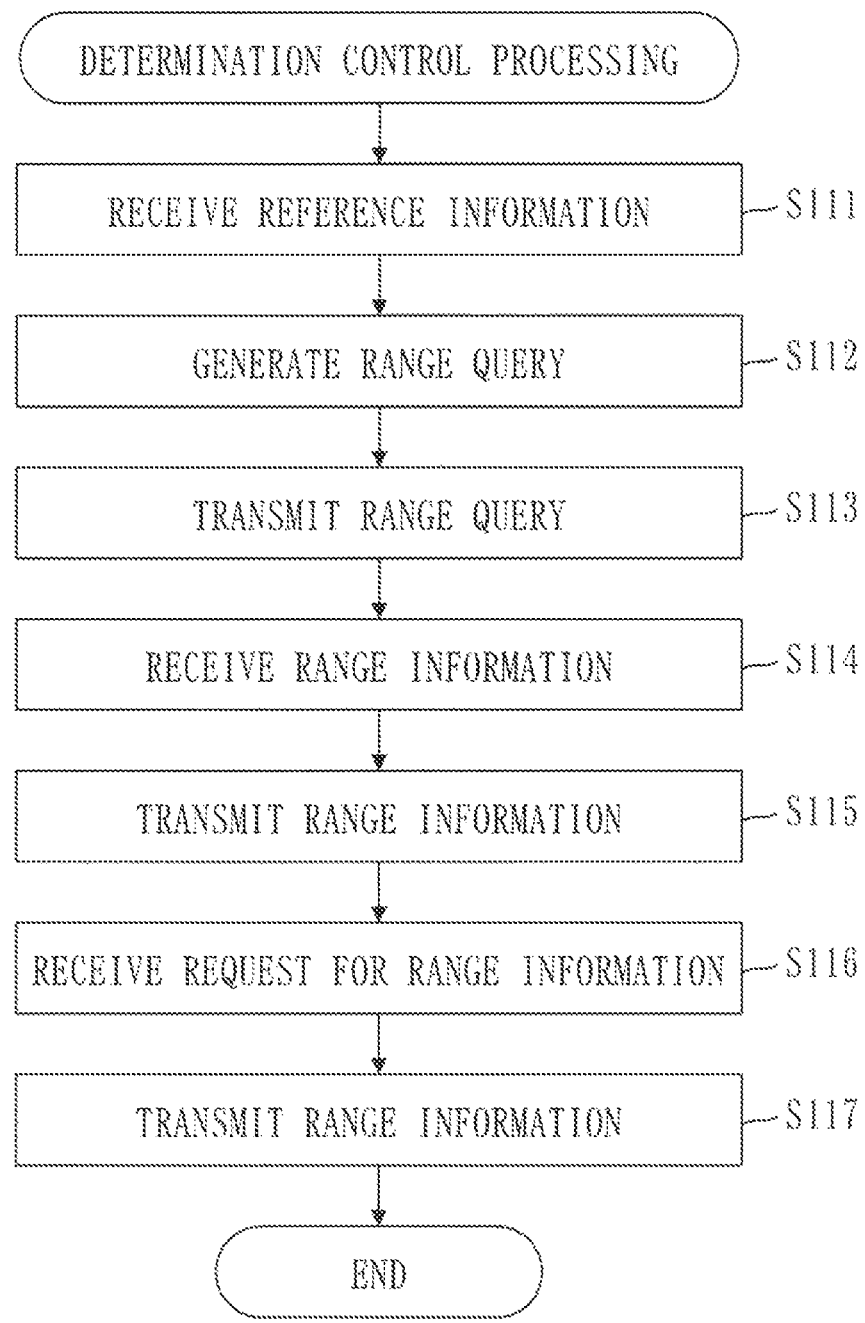
FIG. 10 is a flowchart of determination control processing in Embodiment 1.

Determination control processing will be described referring to FIG. 10.

The determination control processing is processing that is executed by the determination control unit 211.

In step S111, the determination control unit 211 receives the reference information transmitted by the user 101 and stores the received reference information to the storage unit 291.

In step S112, the determination control unit 211 generates the range query based on the reference information and stores the generated range query to the storage unit 291. The range query is a query for requesting search of the duplication range.

In step S113, the determination control unit 211 transmits the range query to the graph search unit 212.

More specifically, the determination control unit 211 transmits information indicating an area where the range query is stored, to the graph search unit 212.

In step S114, the determination control unit 211 receives the range information from the graph search unit 212. The range information is information indicating the duplication range.

More specifically, the determination control unit 211 receives information indicating an area where the range information is stored, from the graph search unit 212, and acquires the range information from the area indicated by the received information.

In step S115, the determination control unit 211 transmits the range information to the acquisition query generation unit 221.

More specifically, the determination control unit 211 transmits the information indicating the area where the range information is stored, to the acquisition query generation unit 221.

In step S116, the determination control unit 211 receives a request for range information from the registration query generation unit 242.

In step S117, the determination control unit 211 transmits the range information to the registration query generation unit 242.

More specifically, the determination control unit 211 transmits the information indicating the area where the range information is stored, to the registration query generation unit 242.

Figure 11:
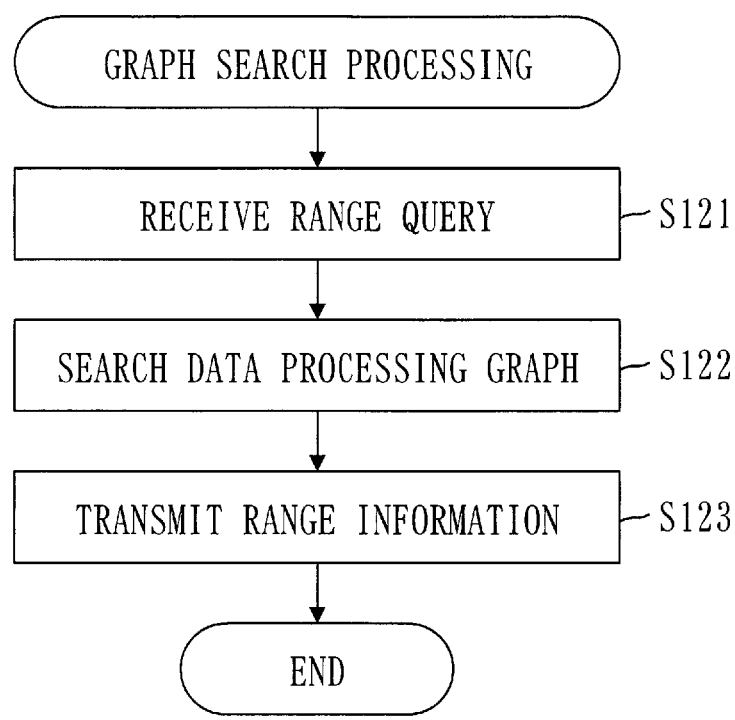
FIG. 11 is a flowchart of graph search processing in Embodiment 1.

Graph search processing will be described referring to FIG. 11.

The graph search processing is processing that is executed by the graph search unit 212.

In step S121, the graph search unit 212 receives the range query from the determination control unit 211.

More specifically, the graph search unit 212 receives the information indicating the area where the range query is stored, from the determination control unit 211, and acquires the range query from the area indicated by the received information.

In step S122, the graph search unit 212 searches the data processing graph 300 according to the range query to thereby acquire the range information from the data processing graph 300. Then, the graph search unit 212 stores the range information to the storage unit 291.

How the data processing graph 300 is searched will be described later.

In step S123, the graph search unit 212 transmits the range information to the determination control unit 211.

More specifically, the graph search unit 212 transmits the information indicating the area where the range information is stored, to the determination control unit 211.

Figure 12:
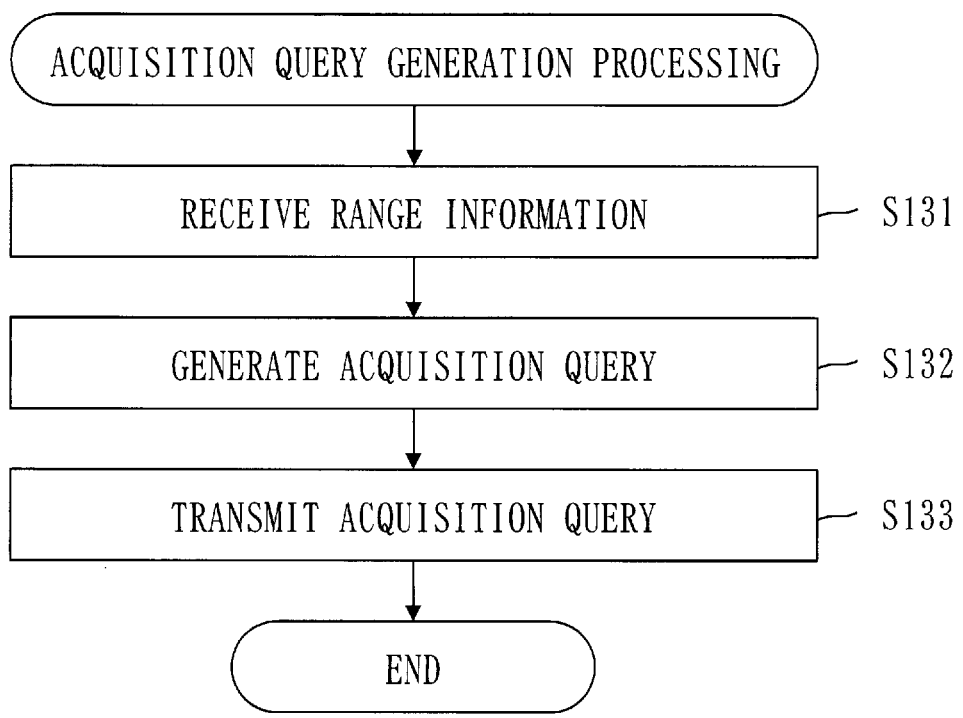
FIG. 12 is a flowchart of acquisition query generation processing in Embodiment 1.

Acquisition query generation processing will be described referring to FIG. 12.

The acquisition query generation processing is processing that is executed by the acquisition query generation unit 221.

In step S131, the acquisition query generation unit 221 receives the range information from the determination control unit 211.

More specifically, the acquisition query generation unit 221 receives the information indicating the area where the range information is stored, from the determination control unit 211, and acquires the range information from the area indicated by the received information.

In step S132, the acquisition query generation unit 221 generates the acquisition query based on the range information, and stores the generated acquisition query to the storage unit 291. The acquisition query is a query for acquiring the duplicate data and contains the range information.

More specifically, the acquisition query generation unit 221 generates an SQL statement for acquiring the duplicate data, on the basis of the range information. The generated SQL statement is the acquisition query. Note that SQL is an abbreviation for structured query language.

In step S133, the acquisition query generation unit 221 transmits the acquisition query to the acquisition query execution unit 222.

More specifically, the acquisition query generation unit 221 transmits information indicating an area where the acquisition query is stored, to the acquisition query execution unit 222.

Figure 13:
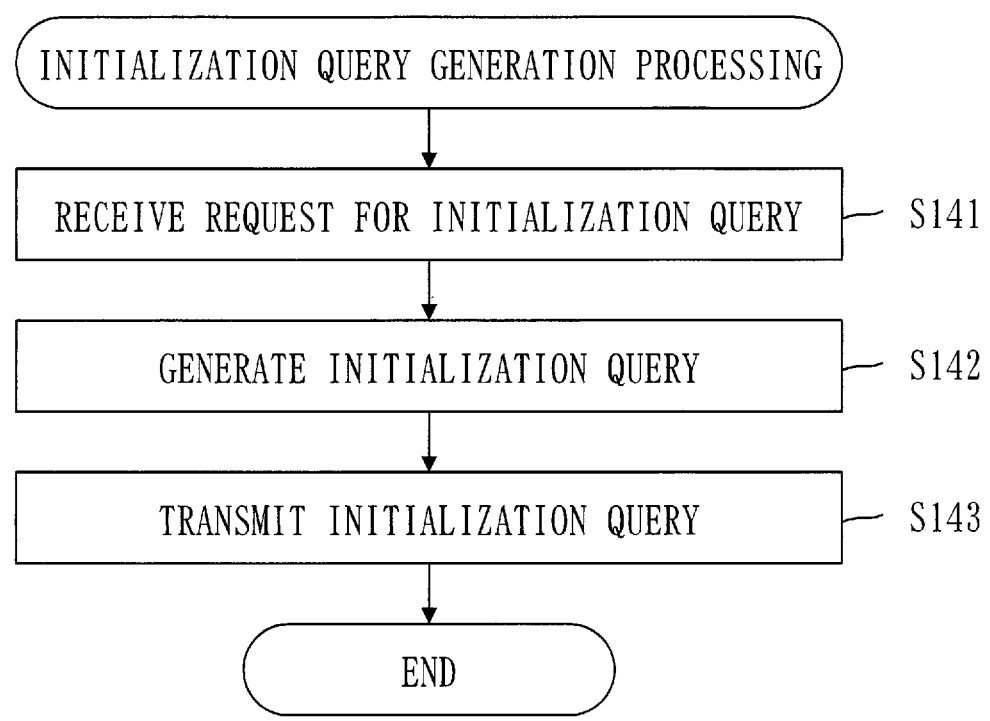
FIG. 13 is a flowchart of initialization query generation processing in Embodiment 1.

Initialization query generation processing will be described referring to FIG. 13.

The initialization query generation processing is processing that is executed by the initialization query generation unit 232.

In step S141, the initialization query generation unit 232 receives a request for an initialization query from the initialization query execution unit 231. The initialization query is a query for initializing the duplicate destination database 121.

In step S142, the initialization query generation unit 232 generates the initialization query and stores the generated initialization query to the storage unit 291.

More specifically, the initialization query generation unit 232 generates an SQL statement for initializing the duplicate destination database 121. The generated SQL statement is the initialization query.

In step S143, the initialization query generation unit 232 transmits the initialization query to the initialization query execution unit 231.

More specifically, the initialization query generation unit 232 transmits information indicating an area where the initialization query is stored, to the initialization query execution unit 231.

Figure 14:
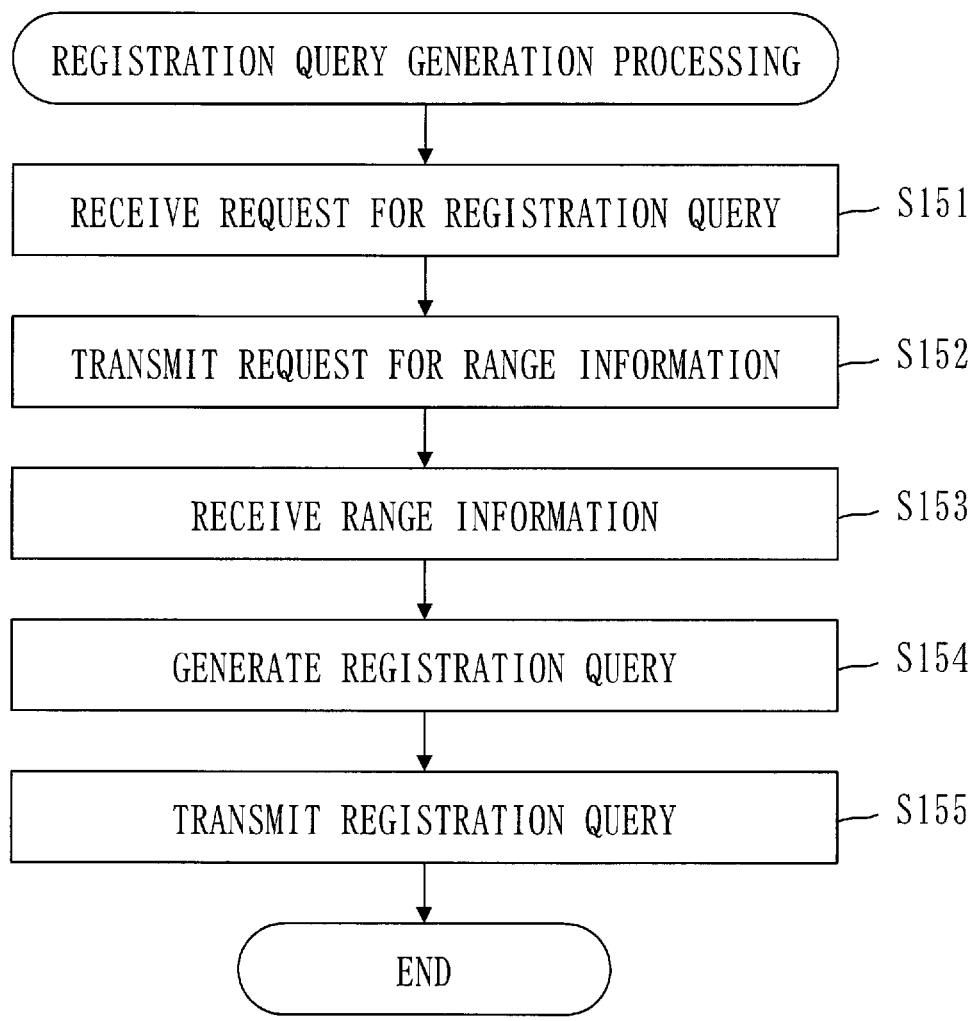
FIG. 14 is a flowchart of registration query generation processing in Embodiment 1.

Registration query generation processing will be described referring to FIG. 14.

The registration query generation processing is processing that is executed by the registration query generation unit 242.

In step S151, the registration query generation unit 242 receives a request for a registration query from the registration query execution unit 241. The registration query is a query for registering the duplicate data with the duplicate destination database 121.

In step S152, the registration query generation unit 242 transmits a request for range information to the determination control unit 211.

In step S153, the registration query generation unit 242 receives the range information from the determination control unit 211.

More specifically, the registration query generation unit 242 receives the information indicating the area where the range information is stored, from the determination control unit 211, and acquires the range information from the area indicated by the received information.

In step S154, the registration query generation unit 242 generates the registration query based on the range information, and stores the generated registration query to the storage unit 291.

More specifically, the registration query generation unit 242 generates an SQL statement for registering the duplicate data with the duplicate destination database 121, on the basis of the range information. The generated SQL statement is the registration query.

In step S155, the registration query generation unit 242 transmits the registration query to the registration query execution unit 241.

More specifically, the registration query generation unit 242 transmits information indicating an area where the registration query is stored, to the registration query execution unit 241.

Figure 15:
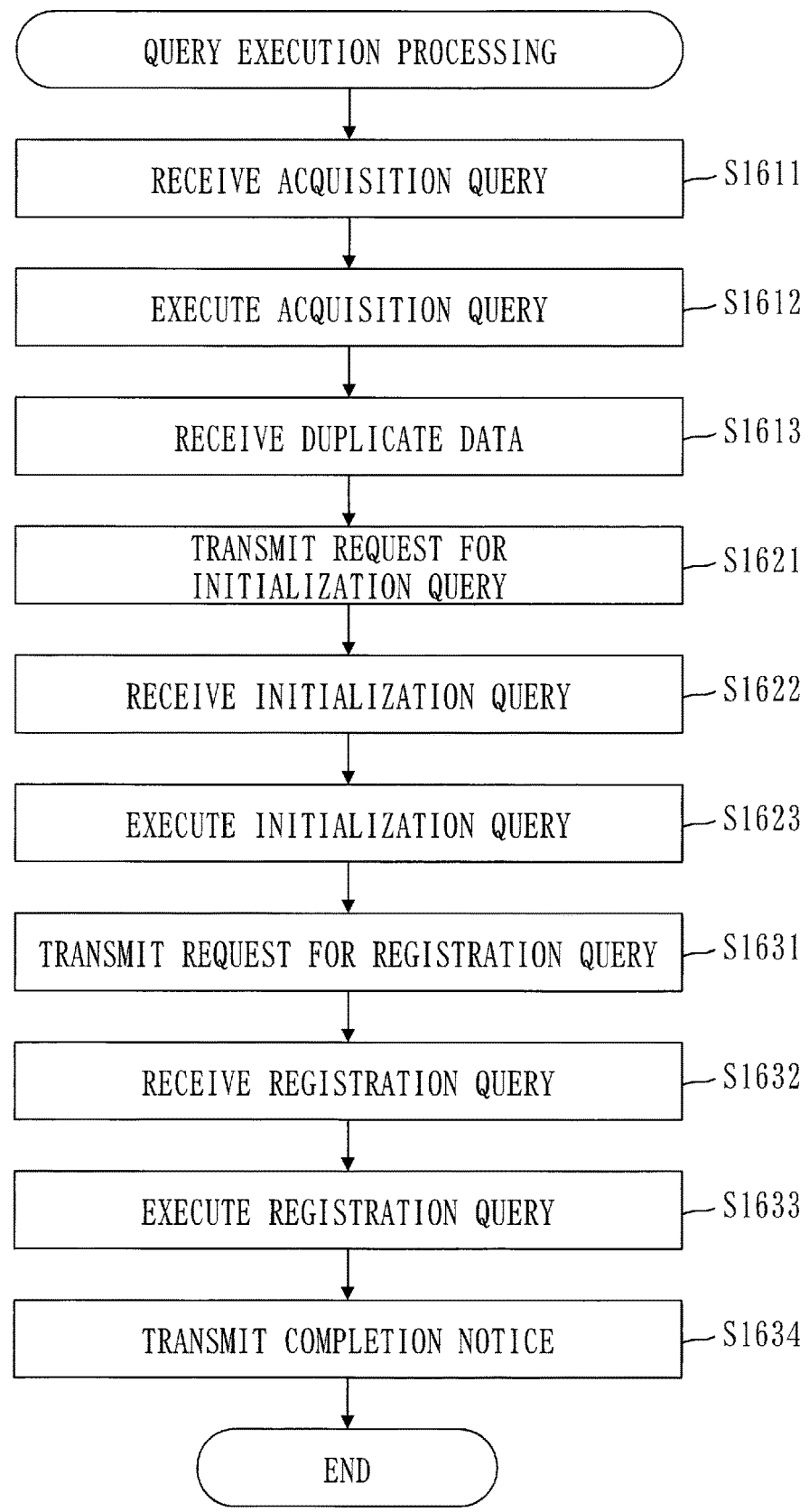
FIG. 15 is a flowchart of query execution processing in Embodiment 1.

Query execution processing will be described referring to FIG. 15.

The query execution processing is processing that is executed by the query execution unit 250. More specifically, the query execution processing is processing that is executed by the acquisition query execution unit 222, the initialization query execution unit 231, and the registration query execution unit 241.

In step S1611, the acquisition query execution unit 222 receives the acquisition query from the acquisition query generation unit 221.

More specifically, the acquisition query execution unit 222 receives information indicating an area where the acquisition query is stored, from the acquisition query generation unit 221, and acquires the acquisition query from the area indicated by the received information.

In step S1612, the acquisition query execution unit 222 executes the acquisition query on the duplicate source database 111.

In step S1613, the acquisition query execution unit 222 receives the duplicate data from the duplicate source database 111 and stores the received duplicate data to the storage unit 291.

In step S1621, the initialization query execution unit 231 transmits a request for an initialization query to the initialization query generation unit 232.

In step S1622, the initialization query execution unit 231 receives the initialization query from the initialization query generation unit 232.

More specifically, the initialization query execution unit 231 receives information indicating the area where the initialization query is stored, from the initialization query generation unit 232.

In step S1623, the initialization query execution unit 231 executes the initialization query on the duplicate destination database 121 to thereby initialize the duplicate destination database 121.

In step S1631, the registration query execution unit 241 transmits a request for a registration query to the registration query generation unit 242.

In step S1632, the registration query execution unit 241 receives the registration query from the registration query generation unit 242.

More specifically, the registration query execution unit 241 receives the information indicating the area where the registration query is stored, from the registration query generation unit 242, and acquires the registration query from the area indicated by the received information.

In step S1633, the registration query execution unit 241 executes the registration query on the duplicate destination database 121 to thereby register the duplicate data with the duplicate destination database 121.

In step S1634, the registration query execution unit 241 transmits the completion notice to the user 101 to thereby inform the user 101 of the completion of duplication.

Figure 16:
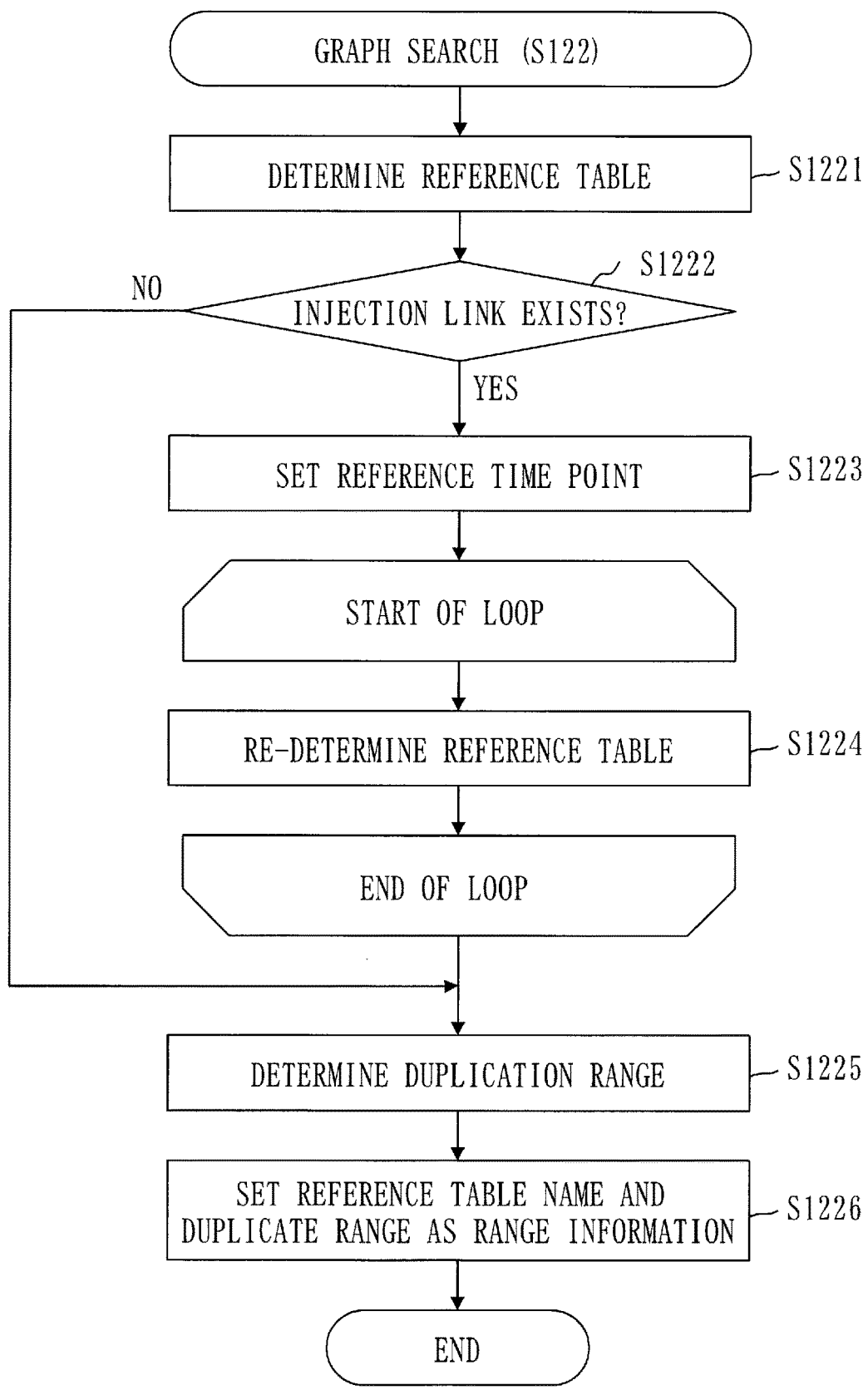
FIG. 16 is a flowchart of graph search (S122) in Embodiment 1.

Graph search (S122) will be described referring to FIG. 16.

Graph search (S122) is a process of searching the data processing graph 300 according to the range query to thereby acquire the range information from the data processing graph 300.

The range query contains reference information such as a table name, a time point, and a user name. The table name which is reference information is referred to as reference table name. The time point which is reference information is called reference time point.

In step S1221, the graph search unit 212 extracts the reference table name from the range query and determines a table identified by the reference table name as a reference table.

In step S1222, the graph search unit 212 determines whether an injection link of the reference table exists. The injection link of the reference table is an injection link that is connected to the table node 301 of the reference table.

That is, the graph search unit 212 selects the table node 301 of the reference table from the data processing graph 300, and determines whether an injection link connected to the table node 301 of the reference table exists.

If an injection link of the reference table exists, the process advances to step S1223.

If an injection link of the reference table does not exist, the process advances to step S1225.

In step S1223, the graph search unit 212 extracts the reference time point from the range query.

The graph search unit 212 sequentially traces the injection link and the column name link from the table node 301 of the reference table to select the data range node 304. That is, the graph search unit 212 traces the injection link from the table node 301 of the reference table to select the output information node 302, and traces the column name link from the selected output information node 302 to select the data range node 304.

Then, the graph search unit 212 sets the reference time point on the selected data range node 304.

A process (S1224) of loop start to loop end is executed for each injection link of the reference table.

In step S1224, the graph search unit 212 sequentially traces the injection link, the output link, the input link, and the acquisition link from the table node 301 of the reference table to select the table node 301. That is, the graph search unit 212 traces the injection link from the table node 301 of the reference table to select the output information node 302, and traces the output link from the selected output information node 302 to select the program node 305. Furthermore, the graph search unit 212 traces the input link from the selected program node 305 to select the input information node 303, and traces the acquisition link from the selected input information node 303 to select the table node 301.

The graph search unit 212 determines a table indicated by the selected table node 301 as the reference table to replace the original reference table.

For example, assume that a table A is the reference table and that a first injection link and a second injection link are connected to a table node 301 of the table A. Assume that the graph search unit 212 selects a table node 301 of a table B by tracing from the first injection link, and selects a table node 301 of a table C by tracing from the second injection link. In this case, the graph search unit 212 determines the table B and the table C as the reference tables to replace the table A.

One or more reference tables are finally determined by step S1221 or step S1224.

Each of the finally determined one or more reference tables is a head table.

The head table is a table that contains data to be inputted to a duplicate source program located at the top of a series of duplicate source programs.

The series of duplicate source programs are a plurality of duplicate source programs that are executed sequentially.

The duplicate source program at the head is a duplicate source program that is executed first.

In step S1225, the graph search unit 212 determines a duplication range for each reference table. The duplication range is the range of data to duplicate.

The graph search unit 212 determines the duplication range for each reference table in accordance with the following procedure.

First, the graph search unit 212 sequentially traces the acquisition link and the column name link from the table node 301 of the reference table (head table) to select the data range node 304 (target data range node). That is, the graph search unit 212 traces the acquisition link from the table node 301 of the reference table to select the input information node 303, and traces the column name link from the selected input information node 303 to select the data range node 304.

The graph search unit 212 then determines the duplication range based on the data range indicated by the selected data range node 304.

More specifically, the graph search unit 212 determines the duplication range as follows.

First, the graph search unit 212 acquires the reference time point and the data range from the selected data range node 304. The data range expresses the relative period and the target time frame.

The graph search unit 212 calculates a target time point using the reference time point and the relative period (data range). The target time point is a time point at the lapse of the relative period since the reference time point.

The graph search unit 212 then determines the target time point and the target time frame (data range) as the duplication range.

Figure 17:
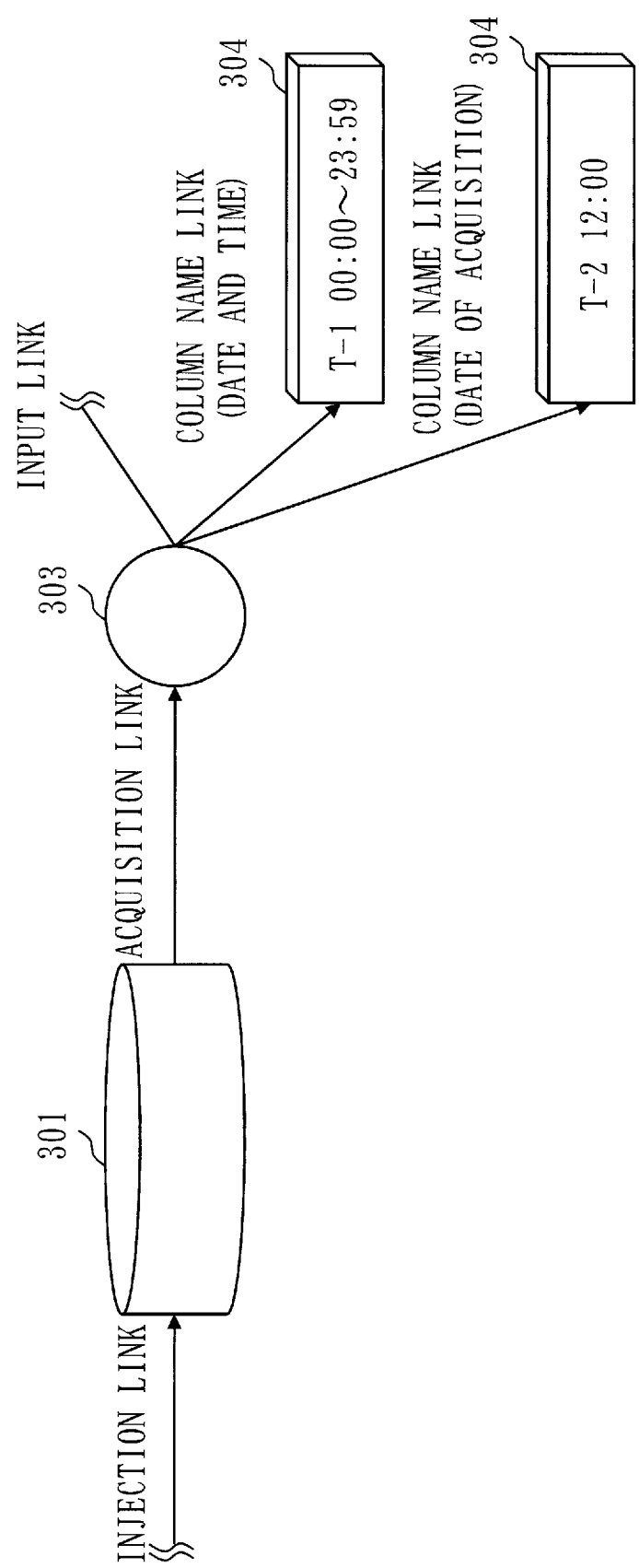
FIG. 17 is a diagram for explaining determination on a duplication range in Embodiment 1.

A specific example of determining the duplication range will be described referring to FIG. 17.

First, the graph search unit 212 traces the acquisition link from the table node 301 of the reference table to select the input information node 303. A first column name link and a second column name link are connected to the input information node 303.

The first column name link is a column name link indicating a column name "date and time".

The second column name link is a column name link indicating a column name "date of acquisition".

The graph search unit 212 traces the first column name link to select a first data range node 304. Furthermore, the graph search unit 212 traces the second column name link to select a second data range node 304.

The graph search unit 212 acquires a first reference time point and a first data range (a first relative period and a first target time frame) from the first data range node 304. In the first data range node 304, "T" represents the first reference time point, "−1" represents the first relative period, and "00:00 to 23:59" represents the first target time frame, where "−1" signifies one day before.

Furthermore, the graph search unit 212 acquires a second reference time point and a second data range (a second relative period and a second target time frame) from the second data range node 304. In the second data range node 304, "T" represents the second reference time point, "−2" represents the second relative period, and "12:00" represents the second target time frame, where "−2" signifies two days before.

The graph search unit 212 calculates a first target time point using the first reference time point "T" and the first relative period "−1". When the first reference time point "T" is Jan. 16, 2017, the first target time point is Jan. 15, 2017.

The graph search unit 212 calculates a second target time point using the second reference time point "T" and the second relative period "−2". When the second reference time point "T" is Jan. 16, 2017, the second target time point is Jan. 14, 2017.

The graph search unit 212 determines the first target time point and the first target time frame as a first duplication range. Furthermore, the graph search unit 212 determines the second target time point and the second target time frame as a second duplication range.

The first duplication range is a duplication range of the column name "date and time".

The second duplication range is a duplication range corresponding to the column name "date of acquisition".

Figure 18:
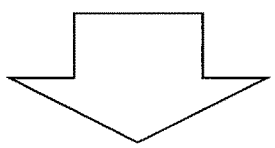
FIG. 18 is a diagram of relation between a reference table and duplicate data in Embodiment 1.

A relation between the reference table and the duplicate data will be described referring to FIG. 18.

In the duplication range corresponding to the column name "date and time", the target time point is Jan. 15, 2017, and the target time frame is from 00:00 to 23:59. In the duplication range corresponding to the column name "date of acquisition", the target time point is Jan. 14, 2017, and the target time frame is 12:00. In this case, the duplicate data indicated in FIG. 18 is obtained.

That is, of the data contained in the reference table, data including the "date and time" of Jan. 15, 2017, 00:00 to 23:59 and the "acquisition date" of Jan. 14, 2017, 12:00 corresponds to the duplicate data.

Back to FIG. 16, step S1226 will be described.

In step S1226, for each reference table, the graph search unit 212 sets a reference table name and a duplication range as the range information.

Effect of Embodiment 1

Since the data processing graph 300 is used, it is possible to search for data necessary for examining output and evaluating output. As a result, minimum data is copied, so that a load to the operation environment system is minimized.

Even when the specifications of the operation environment data are changed, the database can be copied by changing the data processing graph 300. That is, even when the specifications of the operation environment system are changed, the database can be copied without re-fabricating the data duplication device 200. Therefore, working hours necessary when the specifications of the operation environment system are changed can be reduced.

Embodiment 2

Figure 19:
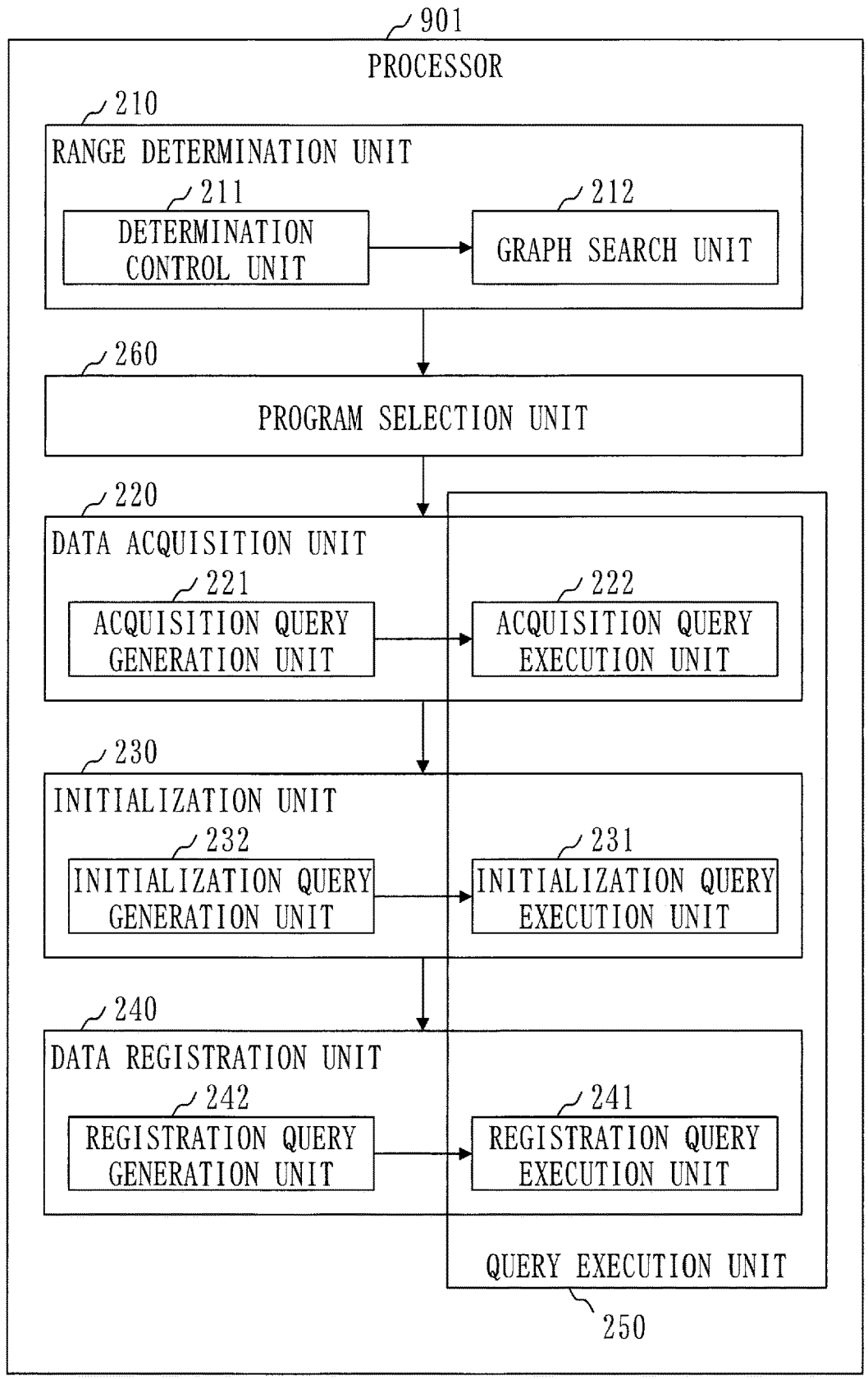
FIG. 19 is a functional configuration diagram of a processor 901 in Embodiment 2.
Figure 21:
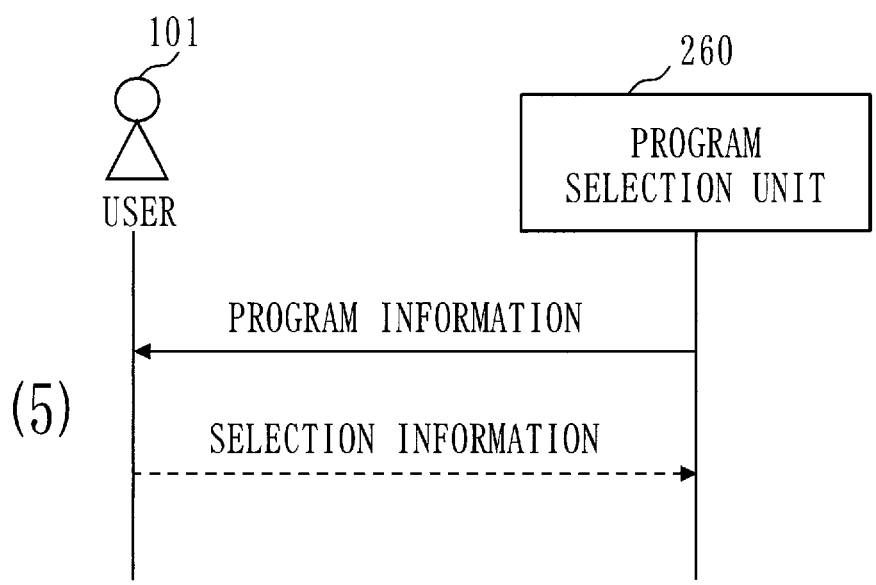
FIG. 21 is a schematic diagram of processing (5) of a data duplication method in Embodiment 2.

A mode of duplicating input data for an arbitrary duplicate source program will be described referring to FIGS. 19 and 21 mainly on differences from Embodiment 1.

Description of Configuration

A functional configuration of a processor 901 will be described referring to FIG. 19.

The processor 901 further serves as a program selection unit 260.

A data duplication program further causes the computer to function as the program selection unit 260.

Description of Operation

Figure 20:
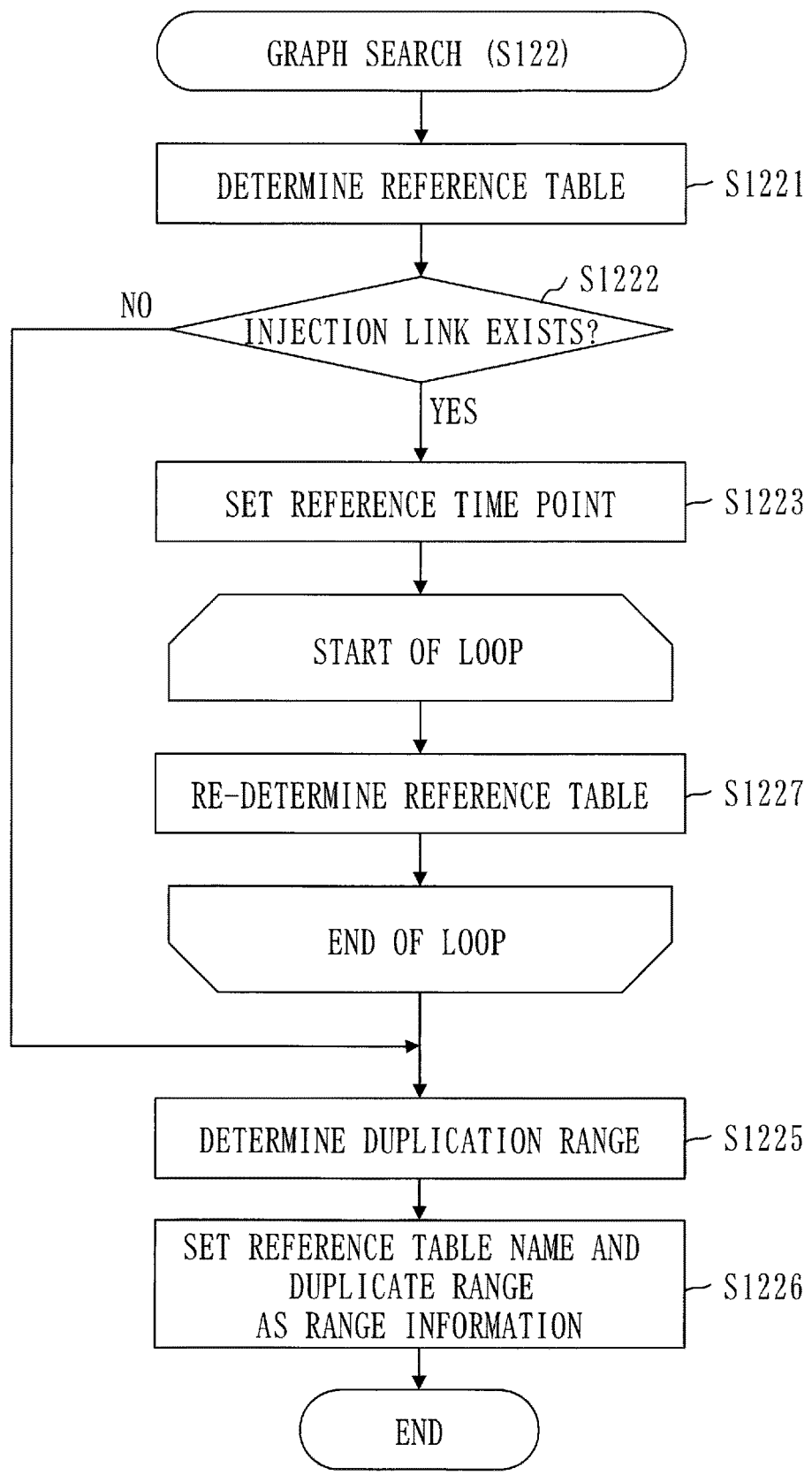
FIG. 20 is a flowchart of graph search (S122) in Embodiment 2.

Graph search (S122) will be described referring to FIG. 20.

Step S1221 to step S1223 have been described in Embodiment 1.

A process (S1227) of loop start to loop end is executed for each injection link of the reference table.

In step S1227, a graph search unit 212 sequentially traces an injection link, an output link, an input link, and an acquisition link from a table node 301 of the reference table to select a table node 301. That is, the graph search unit 212 traces the injection link from the table node 301 of the reference table to select an output information node 302, and traces the output link from the selected output information node 302 to select a program node 305. Furthermore, the graph search unit 212 traces the input link from the selected program node 305 to select an input information node 303, and traces the acquisition link from the selected input information node 303 to select the table node 301.

The graph search unit 212 determines a table indicated by the selected table node 301 as the reference table in addition to the original reference table.

For example, assume that a table A is the reference table and that a first injection link and a second injection link are connected to a table node 301 of the table A. Assume that the graph search unit 212 selects a table node 301 of a table B by tracing from the first injection link, and selects a table node 301 of a table C by tracing from the second injection link. In this case, the graph search unit 212 determines the table B and the table C as the reference tables in addition to the table A.

One or more reference tables are finally determined by step S1221 or step S1227.

The finally determined one or more reference tables are a series of duplicate source tables corresponding to a series of duplicate source programs.

That is, for each of the duplicate source programs that constitute the series of duplicate source programs, a table containing data to be inputted to the duplicate source program is determined as the reference table.

Step S1225 and step S1226 have been described in Embodiment 1.

That is, range information indicating a reference table name and a duplication range is generated for each reference table.

Therefore, range information indicating a reference table name and a duplication range is generated for each of the duplicate source programs that constitute the series of duplicate source programs.

Processing (5) of a data duplication method will be described referring to FIG. 21.

Processing (5) is executed after processing (1) and before processing (2).

In processing (5), the program selection unit 260 selects a target duplicate source program from the series of duplicate source programs.

More specifically, the target duplicate source program is selected as follows.

First, the program selection unit 260 outputs program information. The program information is information indicating the series of duplicate source programs. A specific example of the program information is range information obtained by processing (1). The outputted program information is disclosed to a user 101. For example, the program information is displayed on a display.

The user 101 selects the target duplicate source program from the series of duplicate source programs based on the program information.

The user 101 then inputs selection information to a data duplication device 200. The selection information is information indicating the target duplicate source program.

Then, a program selection unit 260 receives the inputted selection information and stores it to a storage unit 291.

After processing (5), processing (2) to processing (4) are executed.

In processing (2) (see FIG. 7), range information inputted to an acquisition query generation unit 221 from the determination control unit 211 is range information dedicated to the target duplicate source program.

In processing (4) (see FIG. 9), range information as a response to the registration query generation unit 242 from a determination control unit 211 is range information dedicated to the target duplicate source program.

More specifically, the determination control unit 211 identifies the target duplicate source program by referring to the selection information obtained in processing (5) and selects information (reference table name and duplication range) dedicated to the target duplicate source program from the range information obtained in processing (1). The selected information is the range information dedicated to the target duplicate source program. The determination control unit 211 inputs the range information dedicated to the target duplicate source program to the acquisition query generation unit 221 and responds to a registration query generation unit 242 with the range information dedicated to the target duplicate source program.

As a result, in processing (2), duplicate data dedicated to the target duplicate source program is acquired from a duplicate source database 111, and in processing (4), the duplicate data dedicated to the target duplicate source program is registered with a duplicate destination database 121.

Effect of Embodiment 2

A duplication range is determined for each duplicate source program. Therefore, it is possible to duplicate data that is necessary for analyzing an arbitrary duplicate source program and to analyze the arbitrary duplicate source program.

Embodiment 3

Figure 22:
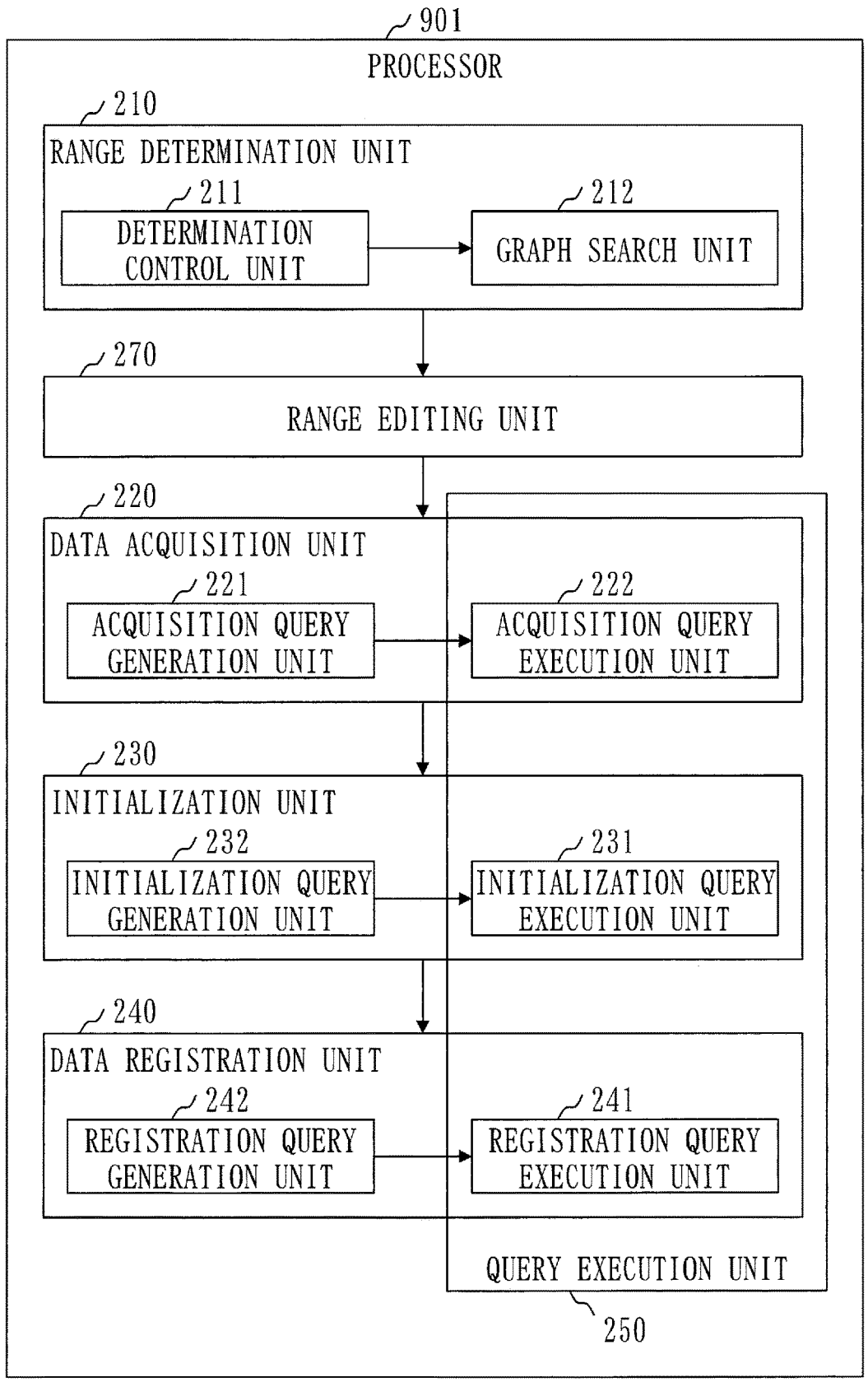
FIG. 22 is a functional configuration diagram of a processor 901 in Embodiment 3.
Figure 23:
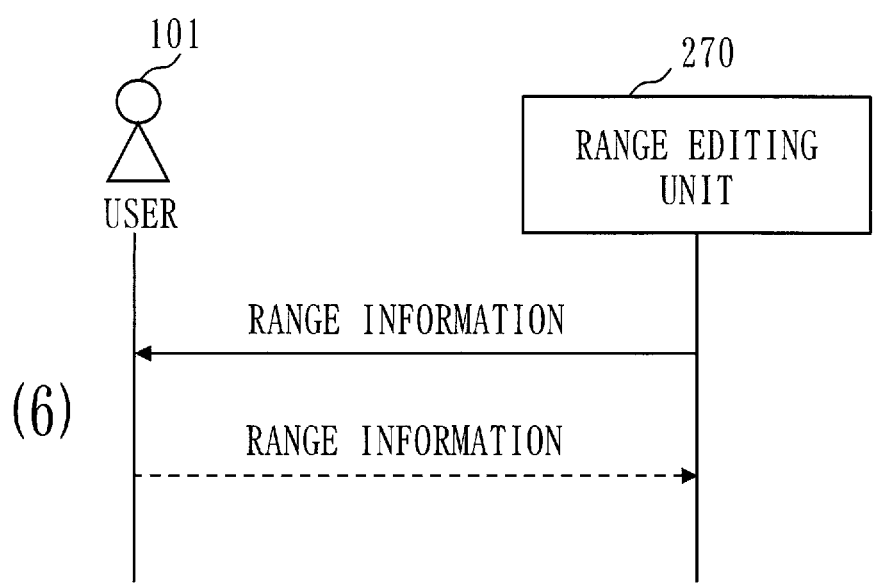
FIG. 23 is a schematic diagram of processing (6) of a data duplication method in Embodiment 3.

A mode of modifying range information will be described referring to FIGS. 22 and 23 mainly on differences from Embodiment 1.

Description of Configuration

A functional configuration of a processor 901 will be described referring to FIG. 22.

The processor 901 further functions as a range editing unit 270.

The data duplicate program further causes the computer to function as the range editing unit 270.

Description of Operation

Processing (6) of a data duplication method will be described referring to FIG. 23.

Processing (6) is executed after processing (1) and before processing (2).

In processing (6), the range editing unit 270 edits a duplication range.

More specifically, the duplication range is edited as follows.

First, the range editing unit 270 outputs range information (reference table name and duplication range). The outputted range information is disclosed to a user 101. For example, the range information is displayed on a display.

The user 101 edits the range information.

The user 101 inputs the edited range information to a data duplication device 200.

Then, the range editing unit 270 receives the edited range information and stores it to a storage unit 291.

After processing (6), processing (2) to processing (4) are executed using the edited range information.

Effect of Embodiment 3

The user 101 can change the range information arbitrarily. Therefore, it is also possible to duplicate data that is determined by the user 101 as necessary for analysis.

Other Configurations

Embodiment 3 may be combined with Embodiment 2.

That is, the data duplication device 200 may be provided with the program selection unit 260 and the range editing unit 270.

Embodiment 4

A mode of input/output data to and from the duplicate source program will be described mainly on differences from Embodiment 1.

In Embodiment 1, it is described that the input/output data to and from the duplicate source program is specifically time-series data.

The input/output data to and from the duplicate source program may be data other than time-series data. In that case, the duplication range is a range other than the range of the date and time of data to duplicate.

For example, the input/output data to and from the duplicate source program may be distance data. The distance data is data including a distance. For example, the distance data includes a distance indicating a geographical range. A duplication range for the distance data is a range of distance included in the data to duplicate.

A data duplication method in this embodiment can be applied to a duplicate source system that handles data other than time-series data. For example, the data duplication method in the embodiment can be applied to a system in which data to be used in a duplicate source program is determined based on a geographical range.

Supplement to Embodiments

The data duplication device 200 may be constituted of a plurality of computers.

For example, the data duplication device 200 may be constituted of four computers which are: a computer that functions as the range determination unit 210, a computer that functions as the data acquisition unit 220, a computer that functions as the initialization unit 230, and a computer that functions as the data registration unit 240.

Figure 24:
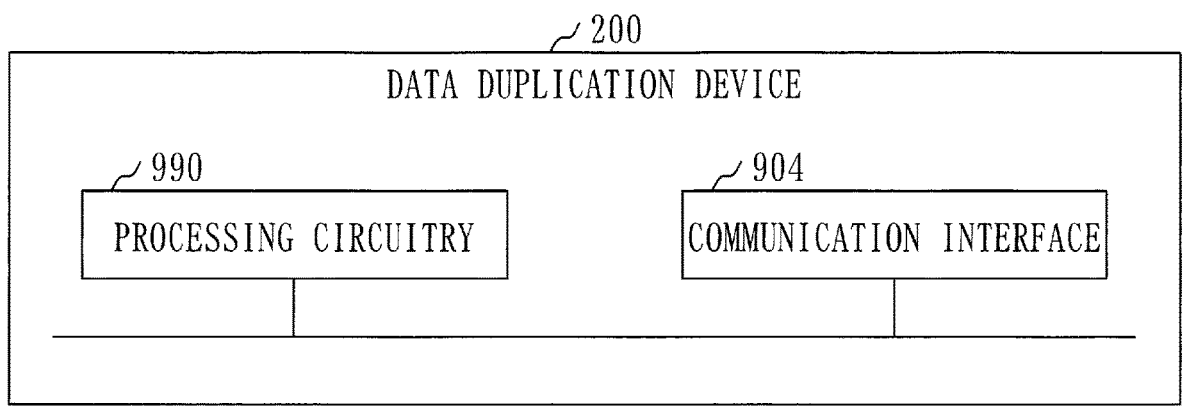
FIG. 24 is a hardware configuration diagram of a data duplication device 200 in the embodiments.

A hardware configuration of the data duplication device 200 will be described referring to FIG. 24.

The data duplication device 200 is provided with a processing circuitry 990.

The processing circuitry 990 is hardware that implements the range determination unit 210, the data acquisition unit 220, the initialization unit 230, the data registration unit 240, and the storage unit 291.

The processing circuitry 990 may be dedicated hardware, or a processor 901 that executes a program stored in the memory 902.

When the processing circuitry 990 is dedicated hardware, the processing circuitry 990 is, for example, a single circuit, a composite circuit, a programmed processor, a parallel-programmed processor, an ASIC, or an FPGA; or a combination of them.

Note that ASIC is an abbreviation for application specific integrated circuit, and FPGA is an abbreviation for field programmable gate array.

The data duplication device 200 may be provided with a plurality of circuits that replace the processing circuitry 990. The plurality of processing circuits share the role of the processing circuitry 990.

Regarding the functions of the data duplication device 200, some of the functions may be implemented by dedicated hardware and the remaining functions may be implemented by software or firmware.

In this manner, the processing circuitry 990 can be implemented by hardware, software, or firmware; or a combination of them.

An embodiment is an exemplification of a preferred mode and is not intended to restrict the technical scope of the present invention. An embodiment may be practiced partly, or may be practiced in combination with another embodiment. The procedure that has been described using a flowchart or the like may be changed appropriately.

REFERENCE SIGNS LIST

100: data duplication system; 101: user; 110: duplicate source system; 111: duplicate source database; 120: duplicate destination system; 121: duplicate destination database; 200: data duplication device; 210: range determination unit; 211: determination control unit; 212: graph search unit; 220: data acquisition unit; 221: acquisition query generation unit; 222: acquisition query execution unit; 230: initialization unit; 231: initialization query execution unit; 232: initialization query generation unit; 240: data registration unit; 241: registration query execution unit; 242: registration query generation unit; 250: query execution unit; 260: program selection unit; 270: range editing unit; 291: storage unit; 292: communication unit; 300: data processing graph; 301: table node; 302: output information node; 303: input information node; 304: data range node; 305: program node; 901: processor; 902: memory; 903: auxiliary storage device; 904: communication interface; 990: processing circuitry

The invention claimed is:

1. A data duplication device comprising:
   a memory having stored therein a searchable data processing graph having a plurality of nodes and links indicating information of input/output data to and from a duplicate source program involved in a duplicate source system; and
   processing circuitry
      to determine a duplication range using the stored data processing graph, the duplication range being a range of data to duplicate from the duplicate source system to a duplicate destination system;
      to acquire duplicate data corresponding to the duplication range from the duplicate source system; and
      to register the duplicate data with the duplicate destination system,
   wherein the plurality of nodes in the data processing graph include:
      a program node indicating the duplicate source program;
      an input information node indicating information of input data out of the input/output data to and from the duplicate source program;
      an output information node indicating information of output data out of the input/output data to and from the duplicate source program;
      a data range node indicating a data range of the input/output data to and from the duplicate source program; and
      a table node indicating a duplicate source table involved in the duplicate source system; and
   wherein the plurality of links include links to connect the program node, the input information node, the output information node, the data range node, and the table node.

2. The data duplication device according to claim 1, wherein the processing circuitry traces links from a table node of a reference table to select a target data range node, and determines the duplication range based on a data range indicated by the target data range node.

3. The data duplication device according to claim 2, wherein the processing circuitry traces links from a table node of the reference table to select a table node of a head table, and traces links from the table node of the head table to select the target data range node.

4. The data duplication device according to claim 2, wherein the processing circuitry traces links from the table node of the reference table to select a table node of a new reference table, and for each reference table, traces links from the table node of the reference table to select a target data range node (304) for each reference table.

5. The data duplication device according to claim 4, wherein the processing circuitry
selects a target duplicate source program,
determines the duplication range for each reference table and selects a duplication range dedicated to the target duplicate source program, and
acquires data corresponding to the duplication range dedicated to the target duplicate source program, as the duplicate data.

6. The data duplication device according to claim 1, wherein the processing circuitry
edits the duplication range, and
acquires data of the edited duplication range as the duplicate data.

7. The data duplication device according to claim 1, wherein the input/output data is time-series data, and
wherein the duplication range is a range of date and time of the data to duplicate.

8. The data duplication device according to claim 1, wherein the input/output data is data other than time-series data, and
wherein the duplication range is a range other than a range of date and time of the data to duplicate.

9. A non-transitory computer readable medium storing a data duplication program that causes a computer to execute:
a range determination process of determining a duplication range using a searchable data processing graph indicating information of input/output data to and from a duplicate source program involved in a duplicate source system, the duplication range being a range of data to duplicate from the duplicate source system to a duplicate destination system;
a data acquisition process of acquiring duplicate data corresponding to the duplication range from the duplicate source system; and
a data registration process of registering the duplicate data with the duplicate destination system,
wherein the data processing graph is stored in memory and includes a plurality of nodes and links,
wherein the plurality of nodes include:
a program node indicating the duplicate source program;
an input information node indicating information of input data out of the input/output data to and from the duplicate source program;
an output information node indicating information of output data out of the input/output data to and from the duplicate source program;
a data range node indicating a data range of the input/output data to and from the duplicate source program; and
a table node indicating a duplicate source table involved in the duplicate source system; and
wherein the plurality of links include:
links to connect the program node, the input information node, the output information node, the data range node, and the table node.

* * * * *